(12) United States Patent
Tsuchiya et al.

(10) Patent No.: US 7,834,968 B2
(45) Date of Patent: Nov. 16, 2010

(54) LIQUID CRYSTAL DEVICE AND ELECTRONIC APPARATUS

(75) Inventors: Yutaka Tsuchiya, Nagano-ken (JP); Toshiyuki Kasai, Okaya (JP); Ayae Sawado, Kai (JP); Akihide Haruyama, Suwa (JP)

(73) Assignee: Seiko Epson Corporation (JP)

( * ) Notice: Subject to any disclaimer, the term of this patent is extended or adjusted under 35 U.S.C. 154(b) by 174 days.

(21) Appl. No.: 12/174,692

(22) Filed: Jul. 17, 2008

(65) Prior Publication Data

US 2009/0040444 A1     Feb. 12, 2009

(30) Foreign Application Priority Data

Aug. 10, 2007   (JP) .............................. 2007-208976

(51) Int. Cl.
G02F 1/1333  (2006.01)
(52) U.S. Cl. ....................... 349/122; 349/143
(58) Field of Classification Search ................. 349/94, 349/122, 143
See application file for complete search history.

(56) References Cited

U.S. PATENT DOCUMENTS

| | | | |
|---|---|---|---|
| 6,597,424 B2 | 7/2003 | Hattori et al. | |
| 6,671,009 B1 | 12/2003 | Hattori et al. | |
| 6,950,172 B2 | 9/2005 | Hattori et al. | |
| 7,142,259 B2 | 11/2006 | Hattori et al. | |
| 2006/0274011 A1* | 12/2006 | Igarashi et al. | ................ 345/94 |

FOREIGN PATENT DOCUMENTS

| | | |
|---|---|---|
| JP | 11-174453 A | 7/1997 |
| JP | 2001-83479 A | 3/2001 |
| JP | 2001-222026 A | 8/2001 |
| JP | 2001296519 | 10/2001 |
| JP | 2002207206 | 7/2002 |
| JP | 2003-280036 A | 10/2003 |

* cited by examiner

*Primary Examiner*—Akm E Ullah
(74) *Attorney, Agent, or Firm*—Lowe Hauptman Ham & Berner, LLP

(57) ABSTRACT

An optically compensated birefringence mode liquid crystal device includes a plurality of gate lines and source lines interesting each other in a plan view, and a plurality of switching elements formed in a one-to-one correspondence with the intersections of the gate lines and the source lines. The device also includes a plurality of pixel electrodes electrically connected to the switching elements, respectively. Each pixel electrode overlaps a part of an adjacent gate line and/or a part of an adjacent source line in the plan view.

9 Claims, 17 Drawing Sheets (SPLAY ALIGNMENT)

(BEND ALIGNMENT)

LIQUID CRYSTAL DEVICE AND ELECTRONIC APPARATUS

RELATED APPLICATIONS

The present application is based on, and claims priority from, Japanese Application Number 2007-208976, filed Aug. 10, 2007, the disclosure of which is hereby incorporated by reference herein in its entirety.

BACKGROUND

1. Technical Field

The present invention generally relates to a liquid crystal device, and more particularly, to a liquid crystal device that operates in an OCB (Optically Compensated Birefringence or Bend) mode. In addition, the invention further relates to an electronic apparatus that is provided with such an optically compensated birefringence liquid crystal device.

2. Related Art

In a typical configuration of an optically compensated birefringence liquid crystal device of the related art, a liquid crystal layer that is sealed between a pair of substrates, which are provided opposite to each other, can switch its alignment/orientation state between so-called splay alignment and so-called bend alignment. In their initial orientation state, liquid crystal molecules of a liquid crystal layer are in splay alignment. An alignment-state transition voltage is applied thereto in order to switch their orientation state from the initial splay alignment to the bend alignment, the latter of which is the orientation mode used for image display. At the time of image display operation thereof, an OCB-mode liquid crystal device of the related art changes its transmission factor dependent on the degree of curves in the bend alignment so as to perform optical modulation. Since the OCB-mode liquid crystal device performs optical modulation for image display in such a way, it offers an advantage of fast/quick response.

In the following description, the fundamental configuration and operation of an optically compensated birefringence liquid crystal device of the related art is explained. FIG. 18 is a set of diagrams that schematically illustrates an example of the pixel configuration of an OCB-mode liquid crystal device of the related art; or, more specifically, FIG. 18A shows a plan view thereof whereas FIG. 18B shows a sectional view taken along the line XVIIIB-XVIIIB of FIG. 18A. As illustrated in FIG. 18B, each pixel 44 of an OCB-mode liquid crystal device of the related art has a sandwiched structure that is made up of an element substrate 10, a counter substrate 30, and a liquid crystal layer 40 that is sealed between the element substrate 10 and the counter substrate 30. As illustrated in FIG. 18A, a plurality of gate lines 12 is formed on the base substrate substance of the element substrate 10. As further illustrated therein, a plurality of source lines 14 is formed on the base substrate substance of the element substrate 10. The gate lines 12 extend in parallel with one another. The source lines 14 also extend in parallel with one another. A TFT (Thin Film Transistor) element 20 is formed at a position corresponding to each intersection of the gate line 12 and the source line 14. A pixel electrode 16 is connected to each of the TFT elements 20. Each of the pixel electrodes 16 is formed at an area that is surrounded by two gate lines 12 arrayed adjacent to each other and two source lines 14 arrayed adjacent to each other. In a plan view, a clearance is formed between the pixel electrode 16 and the gate line 12. In like manner, a gap is formed between the pixel electrode 16 and the source line 14 as viewed in two dimensions.

In order to cause transition in the orientation state of the liquid crystal layer 40 from the initial splay alignment to the bend alignment, as a first step thereof, a transition voltage is applied between the gate line 12 and the pixel electrode 16. As a result of the application of the transition voltage between the gate line 12 and the pixel electrode 16, an electric field F is generated in the liquid crystal layer 40. As illustrated in FIG. 18B, the electric field F has an electric line of force that connects the gate line 12 and the pixel electrode 16. The orientation/alignment direction of liquid crystal molecules 40a contained in the liquid crystal layer 40 changes in accordance with the directional component of the generated electric field F. As a result thereof, a transition force for switching the orientation state of the liquid crystal molecules 40a thereof from the splay alignment to the bend alignment works thereon. At the initial stage of the transition, transition nuclei for switching the orientation state of the liquid crystal molecules 40a thereof from the splay alignment to the bend alignment are generated at each concave region (i.e., concave area) 60 or in the neighborhood thereof. As illustrated in FIG. 18A, the concave region 60 is formed between the gate line 12 and the pixel electrode 16. Thereafter, another transition voltage is applied between the pixel electrode 16 and a common electrode 36. The common electrode 36 is formed on the counter substrate 30. As a result of the application of the transition voltage between the pixel electrode 16 and the common electrode 36, a bend alignment area spreads over the pixel electrode 16, which starts from the transition nucleus. In this way, the orientation state of the liquid crystal molecules 40a of the liquid crystal layer 40 transitions from the splay alignment to the bend alignment in an OCB-mode liquid crystal device of the related art. An example of the orientation-state transition method/scheme of the related art explained above is disclosed in JP-A-2001-296519.

In the typical orientation-state transition method/scheme used in an OCB-mode liquid crystal device of the related art explained above, a transition nucleus is mainly generated at a position corresponding to, for example, in or over, the concave area 60, which is outside the pixel electrode 16. In order to spread a bend alignment area over the pixel electrode 16 from the initial starting point described above, it is necessary for it to "climb over" the pixel electrode 16, that is, overcome a level difference between the concave area 60 and the pixel electrode 16. For this reason, the orientation-state transition method/scheme used in the OCB-mode liquid crystal device of the related art explained above has a disadvantage in that it inevitably requires a greater force for successfully spreading the bend alignment area. For this reason, if the alignment-state transition method/scheme used in the OCB-mode liquid crystal device of the related art explained above is adopted, it is necessary to apply a relatively high transition voltage thereto in order to successfully spread the bend alignment area over the pixel electrode 16. Since a relatively high transition voltage is required, the orientation-state transition method/scheme used in the OCB-mode liquid crystal device of the related art explained above has a disadvantage in that it consumes greater power at the time of splay-to-bend alignment transition operation. Generally speaking, it is necessary to continue the application of a transition voltage thereto until a bend alignment area that is generated at a transition nucleus as a starting point spreads to the entire region over the pixel electrode 16. In connection therewith, time required for the completion of the spreading of a bend alignment area to the entire region over the pixel electrode 16 becomes longer as a pixel becomes larger. In the technical field to which the present invention pertains, a liquid crystal device in which the transition can be completed in a shorter time period with a lower transition voltage so as to achieve reduced power consumption is awaited.

SUMMARY

An advantage of some aspects of the invention is to provide an optically compensated birefringence mode liquid crystal device in which an orientation/alignment state transition can be completed in a shorter time period with a lower transition voltage so as to achieve reduced power consumption, which constitutes non-limiting example of various technical problems that have not yet been fully addressed/solved by a liquid crystal device of the related art.

In order to address the above-identified problems without any limitation thereto, the invention provides, as various aspects thereof, a liquid crystal device and an electronic apparatus having the following novel and inventive features, the non-limiting exemplary configuration and operation of which will be described in detail below in

DESCRIPTION OF EXEMPLARY EMBODIMENTS

First Aspect

The invention provides, as a first aspect thereof, an optically compensated birefringence mode liquid crystal device that includes: a first substrate; a second substrate that is provided opposite to the first substrate; a liquid crystal layer that is interposed between the first substrate and the second substrate, the liquid crystal layer being in a splay alignment while not being driving (while display is not being performed) and in a bend alignment while being driven (while display is being performed); a plurality of gate lines that is formed at the liquid-crystal-layer side of the first substrate; a plurality of source lines that is formed at the liquid-crystal-layer side of the first substrate, the plurality of source lines intersecting with the plurality of gate lines in a plan view; a plurality of switching elements that is formed at the liquid-crystal-layer side of the first substrate, the plurality of switching elements being formed at a positions in a one-to-one correspondence with intersections of the gate lines and the source lines; and a plurality of pixel electrodes that is formed at the liquid-crystal-layer side of the first substrate, one of the pixel electrodes being electrically connected to a corresponding one of the switching elements, wherein the one of the pixel electrodes overlaps in a plan view a part of one of the gate lines that is adjacent to the one of the pixel electrodes and/or a part of one of the source lines that is adjacent to the one of the pixel electrodes.

In the configuration of a liquid crystal device according to the first aspect of the invention described above, the one of the pixel electrodes overlaps in a plan view a part of one of the gate lines that is adjacent to the one of the pixel electrodes and/or a part of one of the source lines that is adjacent to the one of the pixel electrodes. As a result of an application of a transition voltage between the gate line and the pixel electrode and/or between the source line and the pixel electrode, an electric field having a larger normal component with respect to the first substrate is generated in the liquid crystal layer in comparison with that generated by a liquid crystal device having a non-overlapping configuration in which the gate line or the source line does not overlap the pixel electrode at all in a plan view. In addition, the strength of an electric field generated by a liquid crystal device according to the first aspect of the invention described above is greater than the strength of an electric field generated by a liquid crystal device having a non-overlapping configuration. This is because, in the configuration of a liquid crystal device according to the first aspect of the invention described above, at a partial overlap area where the gate line (and/or the source line) and the pixel electrode 16 partially overlap each other, the gate line (and/or the source line) and the pixel electrode are provided in relatively close proximity to each other. Therefore, the generation of an electric field having a relatively large normal component facilitates the generation of splay-to-bend transition nuclei in the liquid crystal layer. This means that it is possible to generate splay-to-bend transition nuclei in the liquid crystal layer with a lower transition voltage. Furthermore, since each of the plurality of pixel electrodes overlaps a part of the gate line and/or a part of the source line in a plan view in the configuration of a liquid crystal device according to the first aspect of the invention described above, each overlapping area at which the gate line (and/or the source line) and the pixel electrode overlap each other has not any clearance/gap formed therebetween in a plan view. That is, in the configuration of a liquid crystal device according to the first aspect of the invention described above, there is not any concave area formed between the gate line (and/or the source line) and the pixel electrode. Such a structure is advantageous in the following point, though not limited thereto: there is not any adverse possibility that a transition nucleus is "trapped" in the concave area at the time of the application of a transition voltage, which would make it difficult for a bend alignment area to climb out of the concave area, thereby making the spreading thereof harder. That is, with the configuration of a liquid crystal device according to the first aspect of the invention described above, it is possible to spread the bend alignment area over the pixel electrode in an easy manner. Thus, it is possible to spread the bend alignment area with a lower transition voltage. In the following description of this specification, the term "transition voltage" means a voltage that is required/applied for causing the orientation-state transition of a liquid crystal layer from splay alignment to bend alignment. In the following description of this specification, the term "plan view" means a directional view taken along the extending direction of a normal line to the first substrate.

Second Aspect

The invention provides, as a preferred second aspect thereof, the liquid crystal device according to the first aspect of the invention, wherein the one of the pixel electrodes has, at least, two sides that extend along the one of the gate lines and further has two sides that extend along the one of the source lines; and the one of the gate lines and/or the one of the source lines does not correspond to the one of the switching elements that is electrically connected to the one of the pixel electrodes.

In the configuration of a liquid crystal device according to the second aspect of the invention described above, the pixel electrode overlaps a part of the gate line and/or a part of the source line in a plan view, where the gate line or the source line does not correspond to the one of the switching elements that is electrically connected to the pixel electrode. Since the gate line and/or the source line is not electrically connected to the above-mentioned pixel electrode, it is possible to reduce adverse effects of any parasitic capacitance on image display even if the parasitic capacitance is generated due to the overlap of the pixel electrode and the gate line, or pixel electrode and the source line. In the configuration of a liquid crystal device according to the second aspect of the invention described above, the partial overlap region at which the gate line and/or the source line partially overlaps the pixel electrode is formed in a limited number or in a limited area. With such a structure, it is possible to reduce parasitic capacitance that is generated due to the overlap of the pixel electrode and the gate line, or pixel electrode and the source line.

Third Aspect

The invention provides, as a preferred third aspect thereof, the liquid crystal device according to the first aspect of the invention, wherein the one of the gate lines and/or the one of the source lines has at least one bent portion; a corresponding side of the one of the pixel electrodes that extends along the one of the gate lines and/or along the one of the source lines is bent along the bent portion of the one of the gate lines and/or of the one of the source lines; and the one of the pixel electrodes overlaps, at the bent portion, a part of the one of the gate lines and/or a part of the one of the source lines in a plan view.

With such a preferred configuration, it is possible to generate splay-to-bend transition nuclei in the vicinity of the bent portion in an easy manner as a result of the application of a transition voltage between the gate line and the pixel electrode and/or between the source line and the pixel electrode. Therefore, it is possible to carry out orientation-state transition from splay alignment to bend alignment with a lower transition voltage.

Fourth Aspect

The invention provides, as a preferred fourth aspect thereof, the liquid crystal device according to the third aspect of the invention, wherein the bent portion has a shape of an alphabet V or a shape of a rectangle.

With such a preferred configuration, it is possible to generate splay-to-bend transition nuclei in the vicinity of the corners/bents of the V-shaped bent portion or the rectangular bent portion in an easy manner as a result of the application of a transition voltage between the gate line and the pixel electrode and/or between the source line and the pixel electrode. Or, if the corners/bents of the V-shaped bent portion or the rectangular bent portion are formed in close proximity to each other or one another, it is possible to generate splay-to-bend transition nuclei in the vicinity of the sides/edges of the V-shaped bent portion or the rectangular bent portion in an easy manner as a result of the application of a transition voltage between the gate line and the pixel electrode and/or between the source line and the pixel electrode. Therefore, it is possible to carry out orientation-state transition from splay alignment to bend alignment with a lower transition voltage.

Fifth Aspect

The invention provides, as a preferred fifth aspect thereof, the liquid crystal device according to the third aspect of the invention, further including: a reflective film that is formed at, at least, an area extending in a plan view along, or an area that has a side extending in a plan view along the bent portion at the liquid-crystal-layer side of the first substrate; and a liquid crystal layer thickness adjustment layer that is formed at a region that overlaps the reflective film in a plan view at the liquid-crystal-layer side of the second substrate.

In the configuration of a liquid crystal device according to the fifth aspect of the invention described above, splay-to-bend transition nuclei are generated as a result of the application of a transition voltage between the gate line and the pixel electrode and/or between the source line and the pixel electrode in the formation area of the reflective film and the liquid crystal layer thickness adjustment layer or in the vicinity thereof. The thickness of the liquid crystal layer measured at the reflective-film area at which the reflective film is formed is smaller than the thickness of the liquid crystal layer measured at the non-reflective-film area at which the reflective film is not formed. The difference in thickness of the liquid crystal layer between the reflective-film area and the non-reflective-film area equals to the thickness of the liquid crystal layer thickness adjustment layer. Because of such a structure, at the reflective-film area at which the reflective film is formed, the strength of an electric field that is generated in the liquid crystal layer as a result of the application of a transition voltage between the gate line and the pixel electrode and/or between the source line and the pixel electrode is relatively large. Thus, it is further possible to spread the bend alignment area in a short period of time. Therefore, the configuration of a liquid crystal device according to the fifth aspect of the invention described above makes it possible to spread the bend alignment area along the reflective-film area at which the reflective film is formed in a short period of time.

Sixth Aspect

The invention provides, as a preferred sixth aspect thereof, the liquid crystal device according to the fifth aspect of the invention, wherein two sides of the one of the pixel electrodes that are opposite to each other are bent along the bent portion of the one of the gate lines and/or of the one of the source lines; and the reflective film and the liquid crystal layer thickness adjustment layer are formed at an area that extends from one of the two sides to the other opposite side thereof in a plan view in a single non-separated manner.

In the configuration of a liquid crystal device according to the sixth aspect of the invention described above, an area that has smaller thickness in the liquid crystal layer is formed in such a manner that it extends from each of the above-mentioned at least two sides of the pixel electrode, which are opposite to each other, to the central region of the pixel electrode in a plan view in a single non-separated manner. Therefore, it is possible to spread bend alignment areas from transition nuclei that were generated in the vicinity of the above-mentioned two sides of the pixel electrode, which constitutes a starting point thereof, to the center area of the pixel electrode in a short period of time.

Seventh Aspect

The invention provides, as a preferred seventh aspect thereof, the liquid crystal device according to the sixth aspect of the invention, wherein the reflective film and the liquid crystal layer thickness adjustment layer have an area portion whose width increases as a distance from the bent side of the one of the pixel electrodes increases or an area portion whose width is relatively large as a distance from the bent side of the one of the pixel electrodes is relatively great.

In the configuration of a liquid crystal device according to the seventh aspect of the invention described above, the bend alignment area that spreads from the above-mentioned at least two sides of the pixel electrode that are opposite to each other to the center area of the pixel electrode has, at the center area of the pixel electrode, a spreading velocity component that is parallel to the above-mentioned at least two sides of the pixel electrode. Therefore, even when the bend alignment area spreads over a region at which the reflective film and the liquid crystal layer thickness adjustment layer are not formed, it does so while having the above-described spreading velocity component. For this reason, it is possible to spread the bend alignment area in a short period of time.

Eighth Aspect

The invention provides, as a preferred eighth aspect thereof, the liquid crystal device according to the sixth aspect of the invention, wherein the reflective film and the liquid crystal layer thickness adjustment layer have an area portion that extends in a radial pattern at a center area of the one of the pixel electrode.

In the configuration of a liquid crystal device according to the eighth aspect of the invention described above, the bend alignment area that spreads from the above-mentioned at least two sides of the pixel electrode that are opposite to each other to the center area of the pixel electrode has, at the radial pattern portion of the reflective film and the liquid crystal layer thickness adjustment layer, various spreading velocity components along the extending directions of the above-mentioned radial pattern portion thereof. Therefore, even when the bend alignment area spreads over a region at which the reflective film and the liquid crystal layer thickness adjustment layer are not formed, it does so while having the above-described spreading velocity components. For this reason, it is possible to spread the bend alignment area in a short period of time.

Ninth Aspect

The invention provides, as a ninth aspect thereof, an electronic apparatus that is provided with the liquid crystal device according to the first aspect of the invention.

An electronic apparatus according to the ninth aspect of the invention that is provided with the liquid crystal device according to the first aspect of the invention described above is capable of carrying out splay-to-bend orientation-state transition in a short period of time or with reduced power consumption.

BRIEF DESCRIPTION OF THE DRAWINGS

The invention will be described with reference to the accompanying drawings, wherein like numbers reference like elements.

FIG. 1 is a set of diagrams that schematically illustrates an example of the general configuration of a liquid crystal device according to a first exemplary embodiment of the invention; or, more specifically, FIG. 1A shows a perspective view thereof whereas

FIG. 2 is a set of sectional views that schematically illustrates an example of the orientation state (i.e., alignment state) of liquid crystal molecules; or, more specifically, FIG. 2A shows an example of the orientation state of liquid crystal molecules in splay alignment, whereas

FIG. 5 is a set of diagrams that schematically illustrates an example of the pixel configuration of an OCB-mode liquid crystal device according to the first exemplary embodiment of the invention; or, more specifically, FIG. 5A shows a plan view thereof as viewed from the counter-substrate side whereas

FIG. 7 is a set of diagrams that schematically illustrates an example of the pixel configuration of an OCB-mode liquid crystal device according to a second exemplary embodiment of the invention; or, more specifically, FIG. 7A shows a plan view thereof as viewed from the counter-substrate side whereas

FIG. 8 is a set of diagrams that schematically illustrates an example of the pixel configuration of an OCB-mode liquid crystal device according to a third exemplary embodiment of the invention; or, more specifically, FIG. 8A shows a plan view thereof as viewed from the counter-substrate side whereas

FIG. 9 is a set of diagrams that schematically illustrates an example of the pixel configuration of an OCB-mode liquid crystal device according to a fourth exemplary embodiment of the invention; or, more specifically, FIG. 9A shows a plan view thereof as viewed from the counter-substrate side whereas

FIG. 10 is a set of diagrams that schematically illustrates an example of the pixel configuration of an OCB-mode liquid crystal device according to a fifth exemplary embodiment of the invention; or, more specifically, FIG. 10A shows a plan view thereof as viewed from the counter-substrate side whereas

FIG. 11 is a set of diagrams that schematically illustrates an example of the pixel configuration of an OCB-mode liquid crystal device according to a sixth exemplary embodiment of the invention; or, more specifically, FIG. 11A shows a plan view thereof as viewed from the counter-substrate side whereas

FIG. 12 is a set of diagrams that schematically illustrates an example of the pixel configuration of an OCB-mode liquid crystal device according to a seventh exemplary embodiment of the invention; or, more specifically, FIG. 12A shows a plan view thereof as viewed from the counter-substrate side whereas

FIG. 13 is a set of diagrams that schematically illustrates an example of the pixel configuration of an OCB-mode liquid crystal device according to an eighth exemplary embodiment of the invention; or, more specifically, FIG. 13A shows a plan view thereof as viewed from the counter-substrate side whereas

FIG. 14 is a set of diagrams that schematically illustrates an example of the pixel configuration of an OCB-mode liquid crystal device according to a ninth exemplary embodiment of the invention; or, more specifically, FIG. 14A shows a plan view thereof as viewed from the counter-substrate side whereas

FIG. 15 is a set of diagrams that schematically illustrates an example of the pixel configuration of an OCB-mode liquid crystal device according to a tenth exemplary embodiment of the invention; or, more specifically, FIG. 15A shows a plan view thereof as viewed from the counter-substrate side whereas

FIG. 18 is a set of diagrams that schematically illustrates an example of the pixel configuration of an OCB-mode liquid crystal device of the related art; or, more specifically, FIG. 18A shows a plan view thereof whereas

DESCRIPTION OF EXEMPLARY EMBODIMENTS

With reference to the accompanying drawings, the configuration and operation of a liquid crystal device according to exemplary embodiments of the invention is explained below. In addition, an electronic apparatus that is provided with such a liquid crystal device according to exemplary embodiments of the invention is also explained below. It should be noted that, in the accompanying drawings that are mentioned below, the dimensions and/or scales of constituent elements are modified from those that will be adopted in an actual implementation of the invention for the purpose of making them easily recognizable in each illustration.

First Embodiment

A. Configuration of Liquid Crystal Device

Figure 1A:
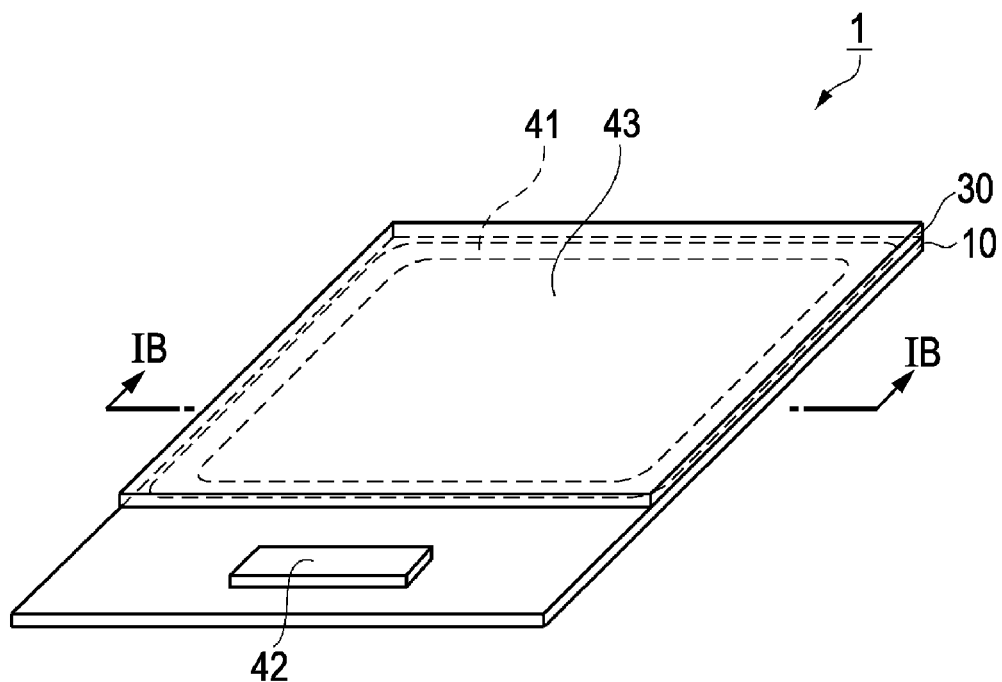
Figure 1B:
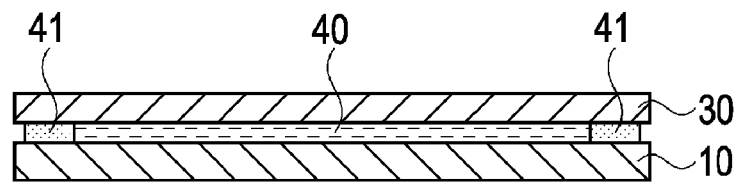
FIG. 1B shows a sectional view taken along the line IB-IB of FIG. 1A.

FIG. 1 is a set of diagrams that schematically illustrates an example of the general configuration of a liquid crystal device 1 according to a first exemplary embodiment of the invention; or, more specifically, FIG. 1A shows a perspective view thereof whereas FIG. 1B shows a sectional view taken along the line IB-IB of FIG. 1A. The liquid crystal device 1 according to the present embodiment of the invention is an active-matrix liquid crystal device that uses TFT (Thin Film Transistor) elements 20 shown in FIG. 4 as the switching elements thereof. In addition, the liquid crystal device 1 according to the present embodiment of the invention is an OCB-mode (Optically Compensated Birefringence Mode) liquid crystal device. The liquid crystal device 1 has an element substrate 10 and a counter substrate 30. The element substrate 10 and the counter substrate 30 are adhered to each other. A sealing material 41 is provided between the element substrate 10 and the counter substrate 30 in the shape of a frame. Accordingly, the element substrate 10 and the counter substrate 30 are provided opposite to each other with the frame-patterned sealant 41 being interposed therebetween. Liquid crystal is sealed inside a space that is enclosed by the element substrate 10, the counter substrate 30, and the sealant 41 so as to constitute a liquid crystal layer 40. The molecular orientation state of the liquid crystal layer 40 can switch between so-called splay alignment and so-called bend alignment. The size of the element substrate 10 is larger than that of the counter substrate 30. Specifically, the element substrate 10 and the counter substrate 30 are adhered to each other in such a manner that a part of the element substrate 10 is formed as a protruding region (i.e., protruding area) that is not covered by the counter substrate 30 and thus exposed to the outside. A driver IC 42 is mounted on the protruding portion of the element substrate 10. The driver IC 42 drives the liquid crystal layer 40.

Figure 2A:
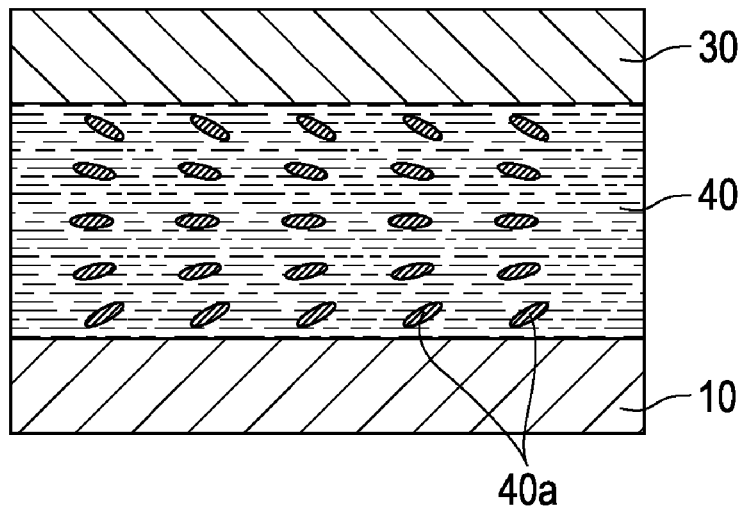
Figure 2B:
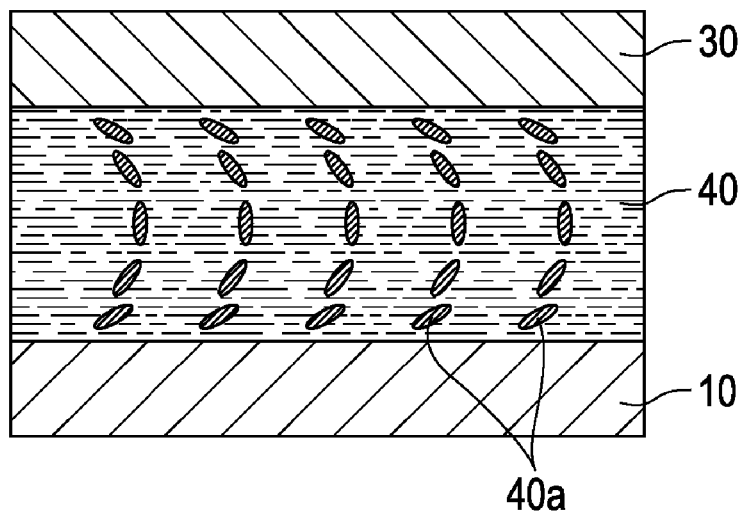
FIG. 2B shows an example of the orientation state of liquid crystal molecules in bend alignment.

The liquid crystal device 1 displays images inside an image display area (i.e., image display region) 43 thereof in which the liquid crystal layer 40 is sealed. While display is not being performed, the liquid crystal layer 40 is in splay alignment as illustrated in FIG. 2A. While display is being performed, the liquid crystal layer 40 is in bend alignment. Before starting to perform display, the orientation state thereof should be switched from the initial splay alignment to the bend alignment. An example of the bend orientation state is shown in FIG. 2B. The transition from the initial splay alignment to the bend alignment is triggered or initiated by the application of a transition voltage to the liquid crystal layer 40. In the bend orientation state, liquid crystal molecules 40a, which are contained in the liquid crystal layer 40, are aligned in an arched pattern. While display is being performed, the liquid crystal device 1 changes its transmission factor dependent on the degree of curves, that is, arches in the bend alignment so as to perform optical modulation for image display.

Figure 3:
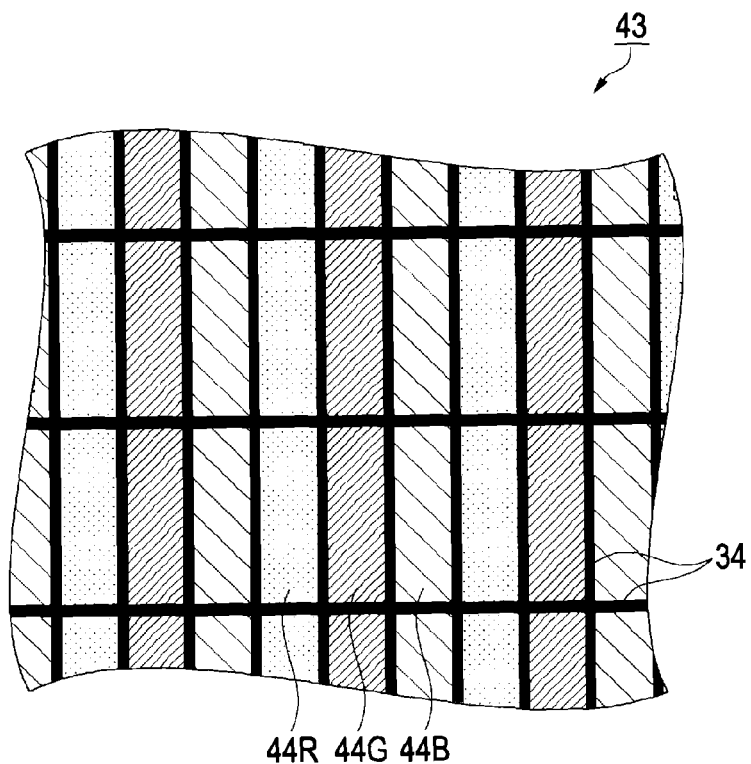
FIG. 3 is an enlarged plan view that schematically illustrates an example of the configuration of the image display area of a liquid crystal device according to an exemplary embodiment of the invention.

FIG. 3 is an enlarged plan view that schematically illustrates an example of the configuration of the image display area 43 of the liquid crystal device 1 according to an exemplary embodiment of the invention. As illustrated in FIG. 3, the liquid crystal device 1 has a number of pixels 44R, 44G, and 44B. The pixels 44R correspond to the red color component of three primary colors. The pixels 44G correspond to the green color component thereof, whereas the pixels 44B correspond to the blue color component thereof. In the following description, these red pixel(s) 44R, green pixel(s) 44G, and/or blue pixel(s) 44B are either collectively or simply referred to as pixel(s) 44 if the context allows no color differentiation to be made among them. The pixels 44 are arrayed in a matrix pattern. In such a matrix pattern, a plurality of the pixels 44 that is arrayed adjacent to one another as viewed not along a certain row but along a certain column corresponds to the same single (i.e., common) color component. Or, in other words, each of the red pixels 44R, the green pixels 44G, and the blue pixels 44B are arrayed in a (vertical) stripe pattern. A light-shielding layer 34 is formed in, for example, a grid pattern in such a manner that the light-shielding layer 34 shuts light off at a region between each adjacent two of the pixels 44. A set or group of three pixels 44R, 44G, and 44B that are arrayed adjacent to one another as viewed not along a certain column but along a certain row makes up the minimum unit of image display. If each of these three pixels 44R, 44G, and 44B is recognized or re-defined as a sub pixel, the preceding sentence can be paraphrased as follows: the set of three sub-pixels 44R, 44G, and 44B that are arrayed adjacent to one another as viewed along a certain row makes up a pixel, which is the minimum unit of display. The liquid crystal device 1 according to the present embodiment of the invention balances the brightness/luminance levels of the red pixel 44R, the green pixel 44G, and the blue pixel 44B in each set of the pixels 44. By this means, the liquid crystal device 1 can display images with various colors.

B. Circuit Configuration of Equivalent Circuit

Figure 4:
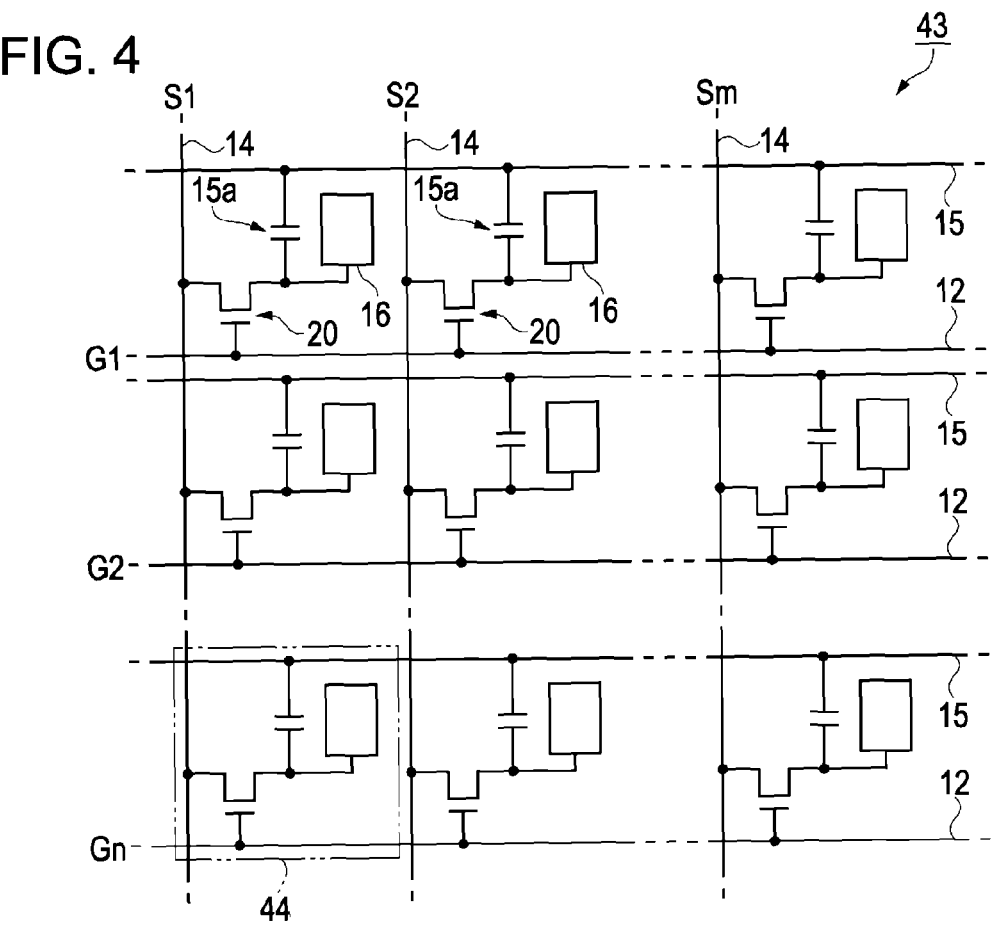
FIG. 4 is an equivalent circuit diagram that schematically illustrates an example of constituent elements and wirings formed in the image display area of a liquid crystal device according to an exemplary embodiment of the invention.

FIG. 4 is an equivalent circuit diagram that schematically illustrates an example of constituent elements and wirings formed in the image display area 43 of the liquid crystal device 1 according to an exemplary embodiment of the invention. The plurality of gate lines 12 and the plurality of source lines 14 intersect (i.e., traverse) each other in the image display area 43 of the liquid crystal device 1. The pixel 44 is formed at a position corresponding to the intersection of the gate line 12 and the source line 14. A pixel electrode 16 is formed for each of the plurality of pixels 44. A capacitor line 15 is formed along the gate line 12. An auxiliary capacitor 15a is formed between the pixel electrode 16 and the capacitor line 15.

The aforementioned TFT element 20, which functions as a switching element/device for performing the electrical-charging control on the corresponding pixel electrode 16, is formed at a position corresponding to the intersection of the gate line 12 and the source line 14. The source terminal (e.g., source electrode) of the TFT element 20 is electrically connected to the source line 14. The gate terminal of the TFT element 20 is electrically connected to the gate line 12. The drain terminal of the TFT element 20 is electrically connected to the pixel electrode 16.

Having the fundamental circuit configuration described above, the liquid crystal device 1 according to the present embodiment of the invention operates as follows so as to display images. The orientation-state transition operation of the liquid crystal device 1 from the initial splay alignment to the bend alignment will be described in detail later.

Image signals S1, S2, . . . , Sm are supplied to the source lines 14. Scanning signals G1, G2, . . . , and Gm are supplied to the gate lines 12 either in a pulse-like manner or in a line-sequential manner at predetermined timing. The operation states of the TFT elements 20 become active upon the reception of the scanning signals G1, G2, . . . , and Gm at the gate terminals thereof, respectively, which are supplied through the gate lines 12. As the TFT elements 20 turn ON upon the reception thereof, the image signals S1, S2, . . . , Sm that are supplied to the TFT elements 20 through the source lines 14 at predetermined timing are applied to the corresponding pixel electrodes 16 via the TFT elements 20.

Figure 5A:
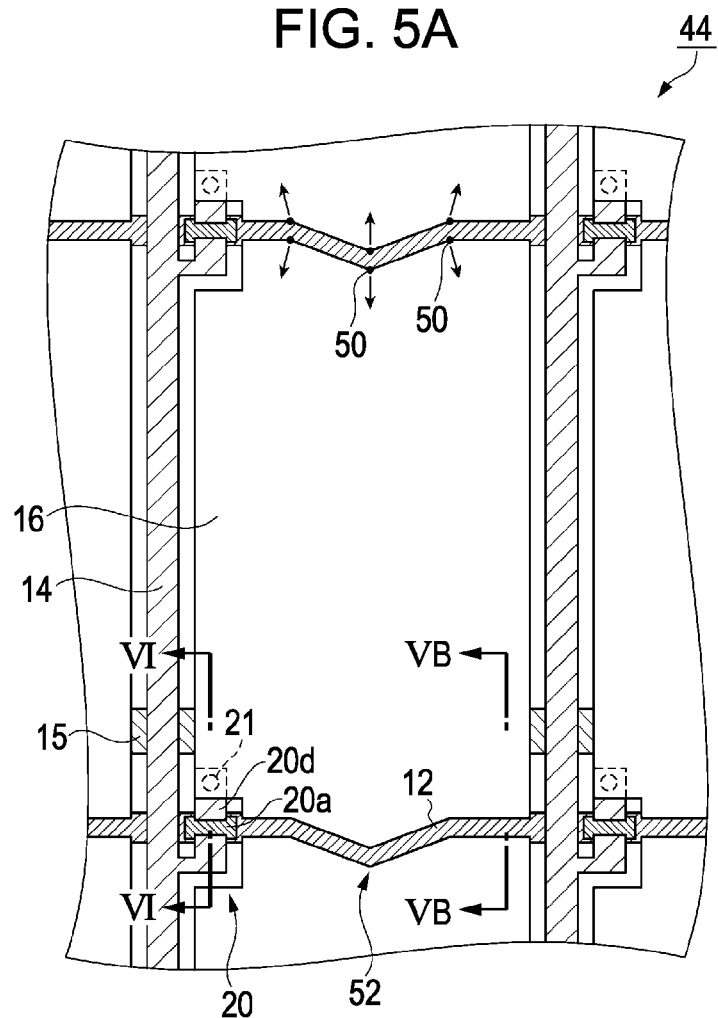
Figure 5B:
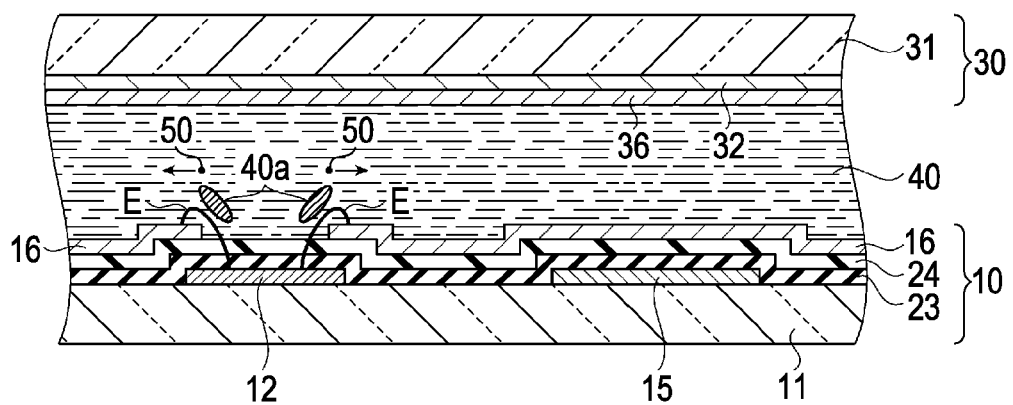
FIG. 5B shows a sectional view taken along the line VB-VB of FIG. 5A.

A driving voltage, the level of which is determined on the basis of predetermined signal levels of the image signals S1, S2, . . . , Sm that are applied to the pixel electrodes 16 and further on the basis of the electric potential of the common electrode 36, which is illustrated in FIG. 5B, is applied to the liquid crystal layer 40. The above-described driving voltage is held for a certain time period at the liquid crystal capacitor of the liquid crystal layer 40 and the auxiliary capacitor 15a. As a result of the application of a driving voltage to the liquid crystal layer 40, the orientation state (i.e., alignment state) of the liquid crystal molecules 40a thereof change in accordance with the level of the driving voltage applied thereto. By this means, an incident light beam that enters the liquid crystal layer 40 is subjected to optical modulation. In this way, the liquid crystal device 1 according to the present embodiment of the invention can perform gradation display.

C. Sectional Configuration of Pixel

Figure 6:
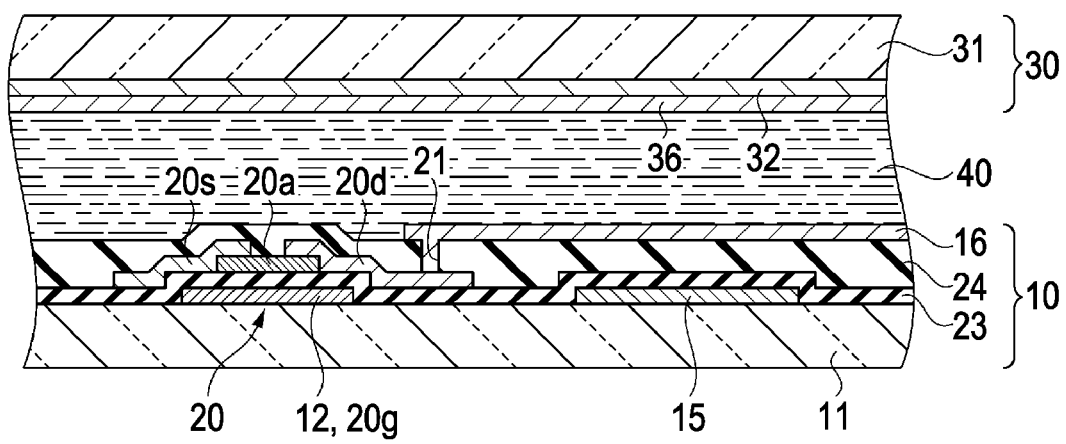
FIG. 6 is a sectional view taken along the line VI-VI of FIG. 5A.

FIG. 5 is a set of diagrams that schematically illustrates an example of the pixel configuration of an OCB-mode liquid crystal device according to the first exemplary embodiment of the invention; or, more specifically, FIG. 5A shows a plan view thereof as viewed from the counter-substrate (30) side whereas FIG. 5B shows a sectional view taken along the line VB-VB of FIG. 5A. FIG. 6 is a sectional view taken along the line VI-VI of FIG. 5A. In the following description of this section C, while making reference to these drawings, the sectional configuration of each of the pixels 44 of a liquid crystal device according to the first exemplary embodiment of the invention is explained, which will be followed by an explanation of the planar configuration thereof in the next section D.

As illustrated in FIG. 6, the element substrate 10 has a base substrate substance (i.e., base substrate) 11. The base substrate substance 11 of the element substrate 10 is a non-limiting example of "a first substrate" according to an aspect of the invention. The base substrate substance 11 of the element substrate 10 can be formed as, for example, a glass substrate or a quartz substrate, though not limited thereto. In the illustrated exemplary configuration of the liquid crystal device 1 according to the present embodiment of the invention, the afore-mentioned gate line 12 and the afore-mentioned capacitor line 15 are formed directly on the liquid-crystal-side (40) surface of the base substrate substance 11. However, the scope of the invention is not limited to such an exemplary configuration. For example, an insulation film that is made of silicon oxide ($SiO_2$) or the like may be deposited between the lower base substrate substance 11 and the upper gate line 12 (capacitor line 15). An inter-bedded insulation layer (i.e., interlayer insulation film) 23, which is made of silicon oxide ($SiO_2$) or the like, is formed at a layer over the gate line 12. A semiconductor layer 20a of the TFT element 20 is formed on the inter-bedded insulation layer 23. The semiconductor layer 20a of the TFT element 20 is made of, for example, amorphous silicon or polysilicon, though not limited thereto. A source electrode 20s of the TFT element 20 is formed in such a manner that a part of the source electrode 20s thereof overlies the semiconductor layer 20a thereof. In like manner, a drain electrode 20d of the TFT element 20 is formed in such a manner that a part of the drain electrode 20d thereof overlies the semiconductor layer 20a thereof. The source electrode 20s of the TFT element 20 can be formed as a part of the source line 14 (refer to FIG. 5A). The TFT element 20 is made up of the semiconductor layer 20a, the source electrode 20s, the drain electrode 20d, and the gate line 12, though not necessarily limited thereto. The gate line 12 doubles as, that is, also functions as the gate electrode 20g of the TFT element 20. It should be noted that, in the configuration of the liquid crystal device 1 according to the present embodiment of the invention, the gate line 12 (i.e., gate electrode 20g), the source electrode 20s, the drain electrode 20d, the source line 14, and the capacitor line 15 may be made of an elemental metal, an alloy, a metal silicide, a polysilicide, or any lamination thereof, which contains at least one of a high melting point metal including but not limited to titanium (Ti), chromium (Cr), tungsten (W), tantalum (Ta), and molybdenum (Mo). Or, they may be made of conductive polysilicon without any limitation thereto.

Another inter-bedded insulation layer 24, which is made of silicon oxide ($SiO_2$) or the like, is formed at a layer over the TFT element 20. The pixel electrode 16 is formed on the inter-bedded insulation layer 24. A contact hole 21 is formed to penetrate through the inter-bedded insulation layer 24. The pixel electrode 16 is electrically connected to the drain electrode 20d of the TFT element 20 through the contact hole 21. The pixel electrode 16 is made of, for example, translucent ITO (indium Tin Oxide), which has light-transmitting property (i.e., translucency), though not limited thereto. The pixel electrode 16 is provided opposite to the capacitor line 15. The auxiliary capacitor 15a (refer to FIG. 4) is formed between the pixel electrode 16 and the capacitor line 15. An alignment film is formed on the pixel electrode 16. The orientation film formed on the pixel electrode 16 is made of polyimide. Note that the alignment film described herein is not illustrated in the drawing. In the illustrated exemplary configuration of the liquid crystal device 1 according to the present embodiment of the invention, the element substrate 10 is made up of layer components that include but not limited to the lowermost base substrate substance 11 and the uppermost alignment film mentioned above.

The counter substrate 30 also has a base substrate substance (i.e., base substrate) 31. The base substrate substance 31 of the counter substrate 30 is a non-limiting example of "a second substrate" according to an aspect of the invention. The base substrate substance 31 of the counter substrate 30 can be formed as, for example, a glass substrate or a quartz substrate, though not limited thereto. A color filter 32 is formed on the liquid-crystal-side (40) surface of the base substrate substance 31. The color filter 32 corresponds to three primary color components of red, green, and blue. These filter color components further correspond to the aforementioned red pixels 44R, the green pixels 44G, and the blue pixels 44B. The afore-mentioned light-shielding layer (refer to FIG. 3) 34 is formed at the same layer as the color filter 32.

The common electrode 36, which is made of ITO or the like, is formed on the (liquid-crystal-side) surface of the color filter 32. The common electrode 36 is formed substantially over the entire region of the image display area 43 (refer to FIG. 1). An alignment film is formed on the common electrode 36. The orientation film formed on the common electrode 36 is made of polyimide. Note that the alignment film described herein is not illustrated in the drawing. In the illustrated exemplary configuration of the liquid crystal device 1 according to the present embodiment of the invention, the counter substrate 30 is made up of layer components that include but not limited to the uppermost base substrate substance 31 and the lowermost alignment film mentioned above.

As has already been described above, the liquid crystal layer 40 is formed between the element substrate 10 and the counter substrate 30. The alignment film formed as a component layer of the element substrate 10 has been subjected to rubbing processing along the gate lines 12 in a plan view, that is, in the horizontal direction in the plan view of FIG. 5A. The alignment film formed as a component layer of the counter substrate 30 has also been subjected to rubbing processing along the gate lines 12 in a plan view, that is, in the horizontal direction in the plan view of FIG. 5A. Accordingly, the liquid crystal molecules 40a contained in the liquid crystal layer 40 are oriented/aligned in the above-mentioned direction along the gate lines 12 in a no-voltage-application state. Therefore, at the time when no voltage is being applied thereto, the liquid crystal layer 40 is in a homogeneous alignment state (i.e., parallel alignment state). Popular nematic liquid crystal can be used to constitute the liquid crystal layer 40 of the liquid crystal device 1 according to the present embodiment of the invention. As a non-limiting configuration example thereof, the thickness of the liquid crystal layer 40 is 5 μm. The liquid crystal molecules 40a thereof has Δn of, for example, 0.15, though not limited thereto.

A polarizing plate (e.g., polarizing film) that is not shown in the drawings is provided on the outer surface of each of the element substrate 10 and the counter substrate 30. The transmission axis of the polarizing plate formed on the outer surface of the element substrate 10 is substantially orthogonal to the transmission axis of the polarizing plate formed on the outer surface of the counter substrate 30. In addition, the transmission axis of the polarizing plate formed on the outer surface of the element substrate 10 forms an angle of approximately 45° with the rubbing-processing direction of the alignment film. Or, in other words, the transmission axis of the polarizing plate formed on the outer surface of the element substrate 10 and the extending direction of the gate lines 12 are at an angle of approximately 45° with respect to each other. In like manner, the transmission axis of the polarizing plate formed on the outer surface of the counter substrate 30 forms an angle of approximately 45° with the rubbing-processing direction of the alignment film. Or, in other words, the transmission axis of the polarizing plate formed on the outer surface of the counter substrate 30 and the extending direction of the gate lines 12 are at an angle of approximately 45° with respect to each other. A phase difference retardation plate (e.g., phase difference retardation film) may be provided, if necessary, between the polarizing plate and the element substrate 10. In addition thereto or in place thereof, a phase difference retardation plate may be provided between the polarizing plate and the counter substrate 30. A λ/4 plate or a combination of a λ/2 plate and a λ/4 plate may be used as such a phase difference retardation plate. In addition, an optical compensation film may be deposited, if necessary, between the polarizing plate and the element substrate 10 and/or between the polarizing plate and the counter substrate 30. Such an optical compensation film may be made of a negative medium having a single axiality that is formed as hybrid-aligned discotic liquid crystal molecules having negative refractive index anisotropy. A non-limiting example thereof is a WV film manufactured by Fuji Photo Film Co., Ltd. Or, alternatively, such an optical compensation film may be made of a positive medium having a single axiality that is formed as hybrid-aligned nematic liquid crystal molecules having positive refractive index anisotropy. A non-limiting example thereof is an NH film manufactured by Nippon Oil Corporation. Or, as still another non-limiting example thereof, such an optical compensation film may be made of a combination of a negative medium having a single axiality that is formed as hybrid-aligned discotic liquid crystal molecules having negative refractive index anisotropy and a positive medium having a single axiality that is formed as hybrid-aligned nematic liquid crystal molecules having positive refractive index anisotropy. As still another non-limiting example thereof, such an optical compensation film may be a dual-axiality medium having the following refractive index relationship in the x, y, and z directions: nx>ny>nz. Or, as still another non-limiting example thereof, a negative C-Plate may be used for such an optical compensation film.

A backlight that is provided with a light source, a reflector, and an optical waveguide board, though not limited thereto, is provided at the outer-surface side of the element substrate 10. Note that the backlight is not illustrated in the drawing.

D. Planar Configuration of Pixel

Among all components of the liquid crystal device 1 according to the present embodiment of the invention, FIG. 5A shows, in a plan view, the layout of element-substrate-side components that make up the element substrate 10. The plurality of gate lines 12 is arrayed in parallel with one another. The plurality of source lines 14 is also arrayed in parallel with one another. The gate lines 12 and the source line 14 intersect (i.e., traverse) each other as viewed in two dimensions. In the illustrated exemplary configuration of the liquid crystal device 1 according to the present embodiment of the invention, the gate lines 12 and the source line 14 are arrayed substantially orthogonal to each other.

The pixel electrode 16 has two sides that extend along two gate lines 12 that are arrayed adjacent to each other. In addition to the above-mentioned two sides that extend along two gate lines 12 that are arrayed adjacent to each other, the pixel electrode 16 further has two sides that extend along two source lines 14 that are arrayed adjacent to each other. The pixel electrode 16 is formed at an area that is surrounded by two gate lines 12 arrayed adjacent to each other and two source lines 14 arrayed adjacent to each other.

The gate line 12 has a V-shaped bent portion 52. Among four sides of the pixel electrode 16, each of two sides thereof that extend along the gate lines 12 also has a V-shaped bent portion that is inflected (in this specification, the term "inflected" is used in the same meaning as "bent") along, or, for example (without any limitation thereto; the same applies hereafter), either perfectly or substantially "fits with" (in the present embodiment, with some overlap therebetween) the above-mentioned V-shaped bent portion 52 of the corresponding gate line 12. The edge region of the pixel electrode 16 is very slightly protruded toward, for example, the centerline (though not limited thereto) of the gate line 12 in such a manner that the above-mentioned each of two sides of the pixel electrode 16 that has the above-mentioned V-shaped bent portion that is inflected along, or, for example, either perfectly or substantially fits with the above-mentioned V-shaped bent portion 52 of the corresponding gate line 12 overlaps a part of the corresponding gate line 12 as viewed in two dimensions.

E. Transition Operation

The liquid crystal device 1 according to the present embodiment of the invention, which has the configuration described above, can cause transition in the orientation state of the liquid crystal layer 40 thereof from the aforementioned splay alignment to the aforementioned bend alignment through the following alignment-state transition operation.

In order to cause the transition in the orientation state of the liquid crystal layer 40 from the initial splay alignment to the bend alignment, as a first step thereof, a transition voltage is applied between the gate line 12 and the pixel electrode 16. The transition voltage has, for example, an alternating rectangular (or square) waveform and a voltage level of 5V, though not limited thereto. The length of a time period of the application of the transition voltage is, for example, 0.5 second, though not limited thereto. The first step of the splay-to-bend alignment state transition operation described above is carried out as a result of the application of an orientation-state transition signal to the gate line 12, and in addition thereto, further as a result of the application of an orientation-state transition signal to the source line 14 with the operation state of the TFT element 20 being set active (i.e., ON) so as to supply the transition signal to the pixel electrode 16.

Figure 18A:
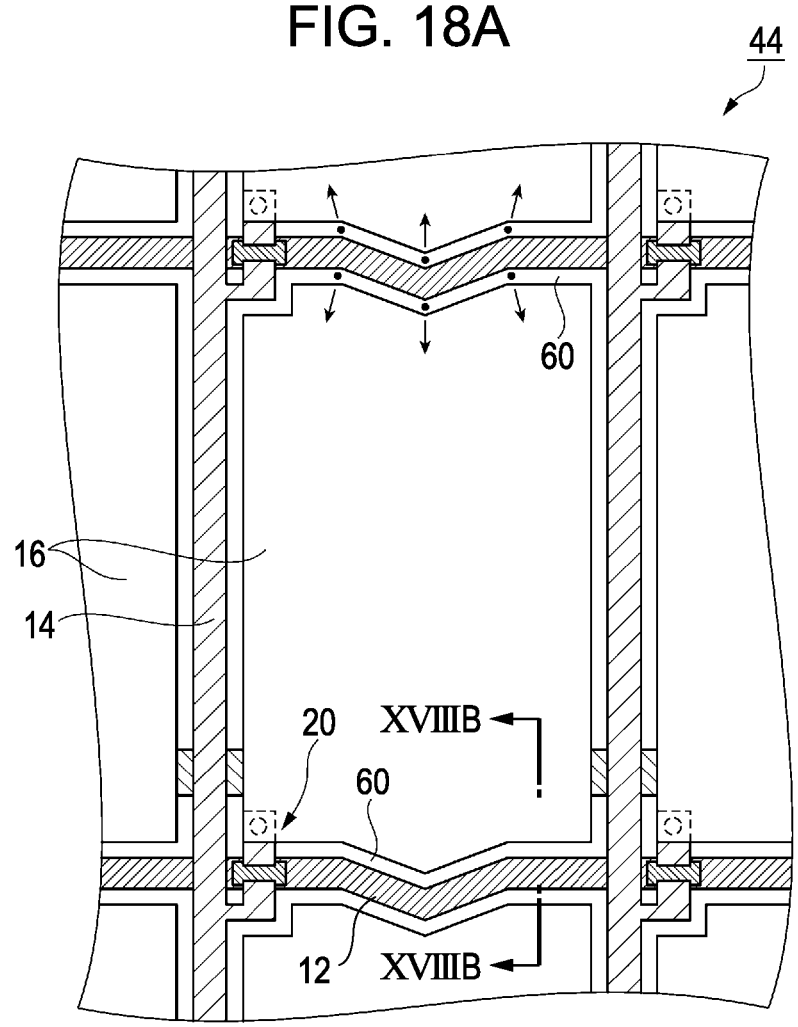
Figure 18B:
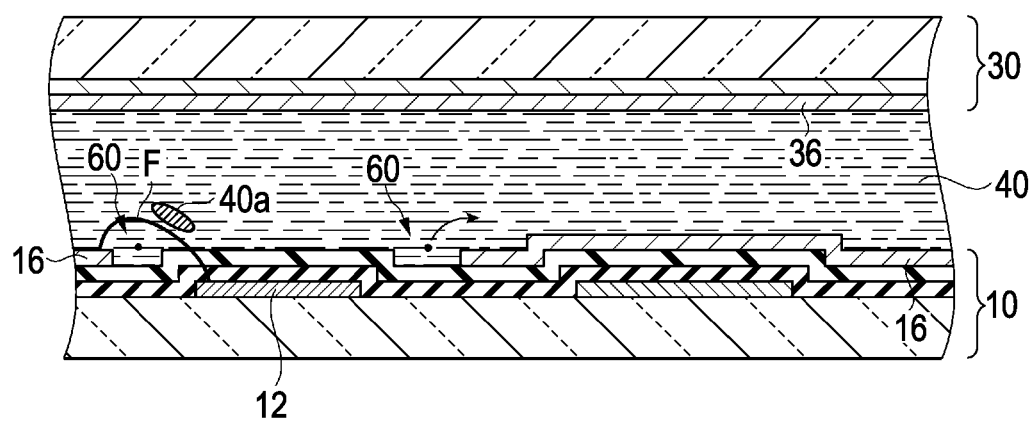
FIG. 18B shows a sectional view taken along the line XVIIIB-XVIIIB of FIG. 18A.

FIG. 5B schematically illustrates an example of an electric field F that is generated in the liquid crystal layer 40 upon the application of the orientation-state transition signal explained above thereto. In addition, FIG. 5B further schematically shows the responsive behavior of the liquid crystal molecules 40a contained in the liquid crystal layer 40. As illustrated in FIG. 5B, at a partial overlap area where the gate line 12 and the pixel electrode 16 partially overlap each other, the gate line 12 and the pixel electrode 16 are provided in (relatively) close proximity to each other. For this reason, an electric field F that has a (relatively) large electric-field component along the direction of a normal line to the surface of the base substrate substance 11 is generated between the gate line 12 and the pixel electrode 16. In the following description, the above-mentioned direction of a normal line to the surface of the base substrate substance 11 may be simply referred to as a vertical direction. For example, in comparison with an electric field F generated by a liquid crystal device of the related art shown in FIG. 18, which has no partial overlap area where the gate line 12 and the pixel electrode 16 partially overlap each other, an electric field F generated by the liquid crystal device 1 of the present embodiment of the invention shown in FIG. 5B, which has the above-mentioned partial overlap area where the gate line 12 and the pixel electrode 16 partially overlap each other, contains a greater electric-field component along the vertical direction. The liquid crystal molecules 40a of the liquid crystal layer 40 change their orientation/alignment direction in accordance with the direction of the electric field F. Since the electric field F according to the present embodiment of the invention contains a greater vertical electric-field component, the liquid crystal molecules 40a of the liquid crystal layer 40 are forced to change their orientation/alignment direction into the vertical direction in accordance with the vertical electric-field component of the electric field F. If the liquid crystal molecules 40a behave as described above, the orientation state thereof changes more easily from the splay alignment to the bend alignment. Therefore, the generation of an electric field F having a relatively large vertical electric-field component facilitates the generation of splay-to-bend transition nuclei in the liquid crystal layer 40. This means that it is possible to generate splay-to-bend transition nuclei in the liquid crystal layer 40 with a lower transition voltage in the first step of the orientation-state transition operation.

The positions at which transition nuclei are generated are located at the boundary between the gate line 12 and the pixel electrode 16 or in the neighborhood thereof as viewed in two dimensions. In the following description of this specification as well as illustration of the accompanying drawings, the above-described positions at which transition nuclei are generated are referred to as transition nucleus generation positions 50 (refer to FIGS. 5A and 5B).

In order to cause transition in the orientation state of the liquid crystal layer 40 from the initial splay alignment to the bend alignment, as a second step thereof, a transition voltage is applied between the pixel electrode 16 and the common electrode 36. The transition voltage has, for example, an alternating rectangular (or square) waveform and a voltage level of 5V, though not limited thereto. In the second step of the alignment-state transition operation described herein, an electric field having the vertical electric-field component in the direction of the normal line to the base substrate substance 11 (i.e., normal component, normal line component) is generated in the liquid crystal layer 40 over the pixel electrode 16. Because of the vertical electric field, the liquid crystal molecules 40a of the liquid crystal layer 40 are driven in a wide area over the pixel electrode 16. As a result thereof, a bend alignment area spreads over the pixel electrode 16, which starts from the transition nucleus that was created in the preceding first step of the alignment-state transition operation. The bend alignment area spreads in the direction indicated by each arrow shown in FIGS. 5A and 5B. Note that the transition nucleus generation position 50 is shown therein as the tail end (i.e., starting point) of each arrow that indicates the spreading direction of the bend alignment area.

As has already been described above, the transition nucleus generation positions 50 are located at the boundary between the gate line 12 and the pixel electrode 16 or in the neighborhood thereof as viewed in two dimensions. For this reason, each transition nucleus is generated in such a manner that at least a portion thereof lies over the edge of the pixel electrode 16. Therefore, at the time when the bend alignment area spreads over the pixel electrode 16 from the initial starting point of the transition nucleus, it is not necessary for it to climb over the pixel electrode 16. Or, in other words, at the time when the bend alignment area spreads over the pixel electrode 16 from the initial starting point of the transition nucleus, it is not necessary for the bend alignment area to overcome a large level difference. For this reason, the configuration of the liquid crystal device 1 according to the present embodiment of the invention makes it possible to spread the bend alignment area more easily. This means that, for example, it is possible to spread the bend alignment area over the pixel electrode 16 with a lower transition voltage.

Each overlapping area at which the gate line 12 and the pixel electrode 16 overlap each other has not any clearance/gap formed therebetween in a plan view. That is, in the configuration of the liquid crystal device 1 according to the present embodiment of the invention, there is not any concave area formed between the gate line 12 and the pixel electrode 16. Such a structure is advantageous in the following point, though not limited thereto: there is not any adverse possibility that a transition nucleus is "trapped" in the concave area, which would make it difficult for a bend alignment area to climb out of the concave area, thereby making the spreading thereof harder. In contrast to the concave configuration of a liquid crystal device of the related art having the non-limiting disadvantage described above, the partial overlap configuration of the liquid crystal device 1 according to the present embodiment of the invention makes it possible to spread the bend alignment area more easily. This means that, for example, it is possible to spread the bend alignment area over the pixel electrode 16 with a lower transition voltage.

As explained above, with the configuration of the liquid crystal device 1 according to the present embodiment of the invention, it is possible to create splay-to-bend transition nuclei with a lower transition voltage in the first step of the orientation-state transition operation thereof. In addition, with the configuration of the liquid crystal device 1 according to the present embodiment of the invention, it is possible to spread the bend alignment area with a lower transition voltage in the second step of the orientation-state transition operation thereof. For this reason, it is possible to reduce power that is consumed by the liquid crystal device 1 for the orientation-state transition from the splay alignment to the bend alignment. In addition, it is possible to use/adopt a lower voltage-resistant driving circuit for image-display operation.

F. Variation Examples of First Embodiment

In the foregoing description of the liquid crystal device 1 according to the first exemplary embodiment of the invention, it is explained that the gate line 12 and the pixel electrode 16 partially overlap each other. However, the scope of the invention is not limited thereto. As a non-limiting modification example thereof, the source line 14 in place of the gate line 12 may partially overlap the pixel electrode 16. When such a modified configuration is adopted, in order to cause the transition in the orientation state of the liquid crystal layer 40 from the initial splay alignment to the bend alignment, as a first step of the orientation-state transition operation thereof, a transition voltage is applied not between the gate line 12 and the pixel electrode 16 but between the source line 14 and the pixel electrode 16. In addition, it is preferable that a V-shaped bent portion(s) should be formed on the source line 14 along which the corresponding side of the pixel electrode 16 is shaped as a fitting bent side.

Or, as another non-limiting modification example thereof, the pixel electrode 16 may partially overlap both of the gate line 12 and the source line 14. In addition, in such a modified configuration, it is preferable that a V-shaped bent portion(s) should be formed on each of the gate line 12 and the source line 14 along which the corresponding side of the pixel electrode 16 is shaped as a fitting bent side.

In the configuration of the liquid crystal device 1 according to the present embodiment of the invention shown in FIG. 5A, the width of the overlapping region at which the gate line 12 and the pixel electrode 16 partially overlap each other is illustrated as approximately 10% to 20% of the width of the gate line 12. However, the scope of the invention is not limited thereto. That is, the width of the overlapping region at which the gate line 12 and the pixel electrode 16 partially overlap each other is not restricted to the specific exemplary width illustrated therein. As a non-limiting modification example thereof, the width of the overlapping region at which the gate line 12 and the pixel electrode 16 partially overlap each other may be almost zero. In such a modified configuration, the side (i.e., edge line) of the pixel electrode 16 and the contour line of the gate line 12 substantially overlap each other in a plan view. Even if such a modified configuration is adopted, it is still possible to produce the advantageous effects of the liquid crystal device 1 according to the first exemplary embodiment of the invention described above.

In the illustrated exemplary configuration of the liquid crystal device 1 according to the first embodiment of the invention, it is explained that the pixel electrode 16 has one V-shaped bent portion that is inflected along, or, for example, either perfectly or substantially fits with the above-mentioned V-shaped bent portion 52 of the corresponding gate line 12. However, the number of bent portion formed on each overlapping side thereof is not limited to one. That is, as a non-limiting modification example thereof, two or more bent portions may be formed on each overlapping side thereof. If two or more bent portions are formed on each overlapping side thereof, it is possible to generate transition nuclei at a larger number of transition nucleus generation positions 50.

As another non-limiting modification example thereof, the gate line 12 and/or the source line 14 may not have any bent portion. Even if the gate line 12 and/or the source line 14 do not have any bent portion, if the gate line 12 and/or the source line 14 partially overlap the pixel electrode 16, it is still possible to carry out the splay-to-bend orientation-state transition with a lower transition voltage.

Second Embodiment

Next, with reference to the accompanying drawing, the configuration of a liquid crystal device according to a second exemplary embodiment of the invention is explained below. Except that the relative positions of the gate lines 12 and the pixel electrodes 16 as viewed in two dimensions according to the second exemplary embodiment of the invention are fundamentally different from the relative positions of the gate lines 12 and the pixel electrodes 16 as viewed in two dimensions according to the foregoing first exemplary embodiment of the invention, the configuration of a liquid crystal device according to the second embodiment of the invention described below is fundamentally the same as the configuration of a liquid crystal device according to the first embodiment of the invention described above.

Figure 7A:
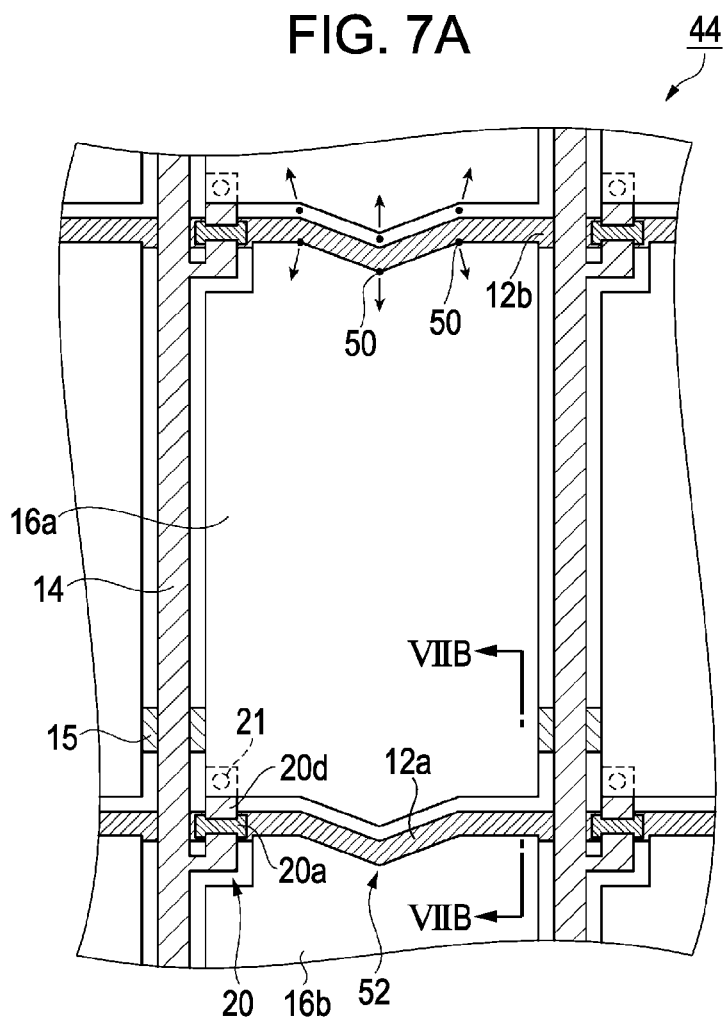
Figure 7B:
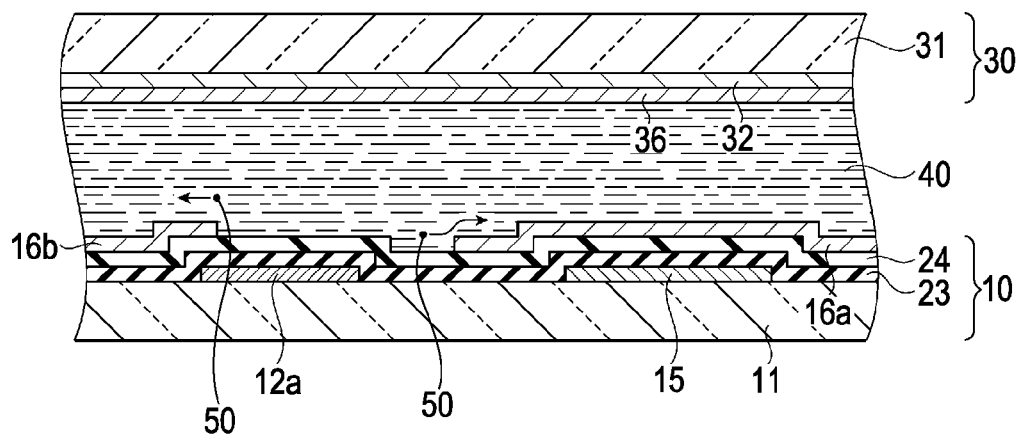
FIG. 7B shows a sectional view taken along the line VIIB-VIIB of FIG. 7A.

FIG. 7 is a set of diagrams that schematically illustrates an example of the pixel configuration of an OCB-mode liquid crystal device according to the second exemplary embodiment of the invention; or, more specifically, FIG. 7A shows a plan view thereof as viewed from the counter-substrate (30) side whereas FIG. 7B shows a sectional view taken along the line VIIB-VIIB of FIG. 7A. As illustrated in FIG. 7A, a pixel electrode 16a is formed between two gate lines 12a and 12b. As further illustrated therein, the pixel electrode 16a partially overlaps the gate line 12b in a plan view. It should be noted that the pixel electrode 16a does not overlap the gate line 12a at all in a plan view. The gate line 12a is electrically connected to the TFT element 20 that corresponds to the pixel electrode 16a, i.e. the gate line 12a corresponds to the pixel electrode 16a, whereas the gate line 12b does not correspond to the pixel electrode 16a (but corresponds to another pixel electrode). That is, as shown in the plan view of FIG. 7A, a partial region of the pixel electrode 16a overlaps a part of the gate line 12b, which is shown (formed) as a top-side gate line as viewed in two dimensions from the pixel electrode 16a on the sheet of the drawing. On the other hand, no region of the pixel electrode 16a overlaps the gate line 12a, which is shown as a bottom-side gate line as viewed in two dimensions from the pixel electrode 16a on the sheet of the drawing. The gate line 12b, which partially overlaps the pixel electrode 16a in a plan view, is not electrically connected to the pixel electrode 16a. Since the gate line 12b is not electrically connected to the pixel electrode 16a, it is possible to reduce adverse effects of any parasitic capacitance on image display even if the parasitic capacitance is generated due to the overlap of the gate line 12b and the pixel electrode 16a.

The gate line 12a is formed between two pixel electrodes 16a and 16b that are arrayed adjacent to each other. As illustrated in (FIG. 7A or) FIG. 7B, the gate line 12a partially overlaps the pixel electrode 16b (in a plan view). Note that the gate line 12a does not overlap the pixel electrode 16a at all. In the configuration of the liquid crystal device 1 according to the second exemplary embodiment of the invention described above, the partial overlap region at which the gate line 12 and the pixel electrode 16 partially overlap each other is formed in a limited area; or, more specifically, the partial overlap region is formed only at one side thereof. With such a structure, it is possible to reduce parasitic capacitance that is generated due to the overlap of the gate line 12 and the pixel electrode 16.

In addition, at the partial overlap region where the gate line 12 and the pixel electrode 16 partially overlap each other, it is possible to produce the same advantageous effects as those offered by the liquid crystal device 1 according to the foregoing first exemplary embodiment of the invention. That is, if the configuration of the liquid crystal device 1 according to the present embodiment of the invention is adopted, at the partial overlap region where the gate line 12 and the pixel electrode 16 partially overlap each other, it is possible to create splay-to-bend transition nuclei with a lower transition voltage in the first step of the orientation-state transition operation thereof; and in addition thereto, it is further possible to spread the bend alignment area with a lower transition voltage in the second step of the orientation-state transition operation thereof. For this reason, it is possible to reduce power that is consumed by the liquid crystal device 1 for the orientation-state transition from the splay alignment to the bend alignment. In addition, it is possible to use/adopt a lower voltage-resistant driving circuit for image-display operation.

Conventionally, an overlapping layout according to which the gate line 12 and the pixel electrode 16 overlap each other has been avoided because it has been considered that such an overlapping layout would cause an increase in parasitic capacitance, which is undesirable. The liquid crystal device 1 according to the second exemplary embodiment of the invention described above offers a technical advantage, thanks to the unique overlapping structure thereof, in that it facilitates orientation-state transition while effectively preventing, suppressing, and/or reducing adverse effects due to parasitic capacitance.

Third Embodiment

Next, with reference to the accompanying drawing, the configuration of a liquid crystal device according to a third exemplary embodiment of the invention is explained below. Except that the respective shapes of the gate lines 12, the source lines 14, and the pixel electrodes 16 as viewed in two dimensions as well as the relative positions thereof according to the third exemplary embodiment of the invention are fundamentally different from the respective shapes of the gate lines 12, the source lines 14, and the pixel electrodes 16 as viewed in two dimensions as well as the relative positions thereof according to the foregoing second exemplary embodiment of the invention, the configuration of a liquid crystal device according to the third embodiment of the invention described below is fundamentally the same as the configuration of a liquid crystal device according to the second embodiment of the invention described above.

Figure 8A:
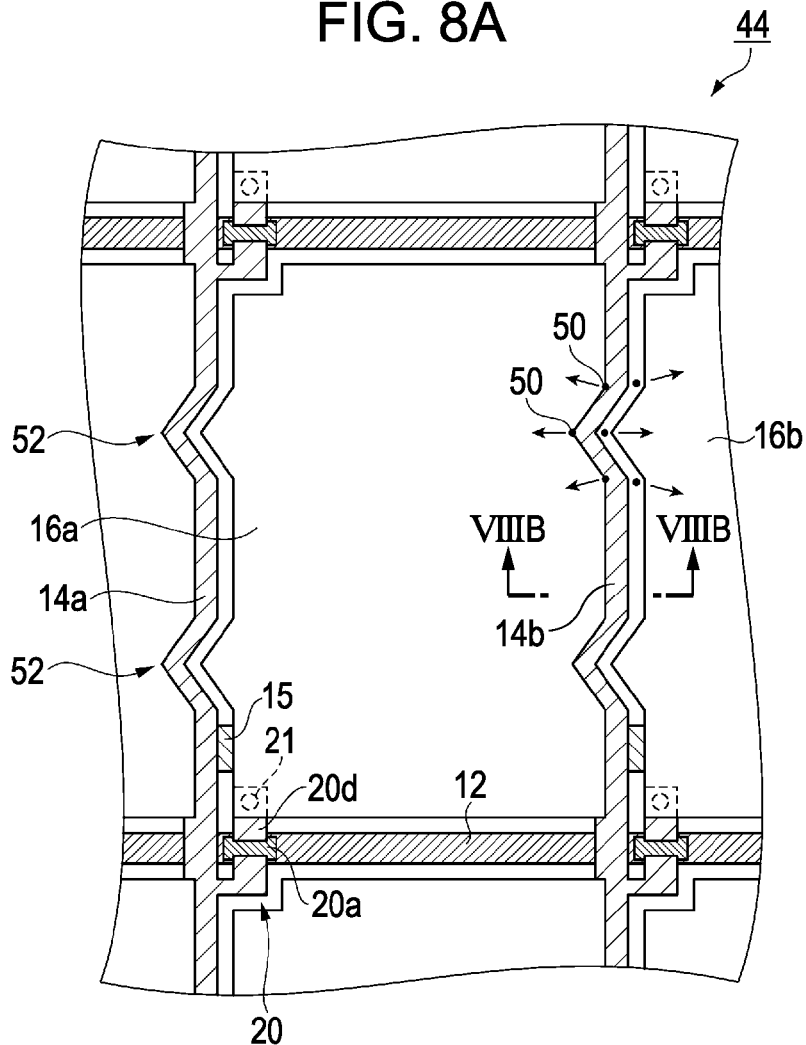
Figure 8B:
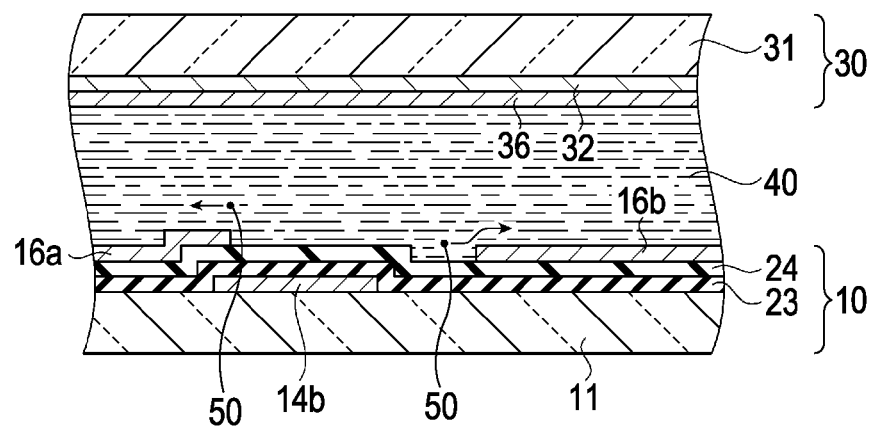
FIG. 8B shows a sectional view taken along the line VIIIB-VIIIB of FIG. 8A.

FIG. 8 is a set of diagrams that schematically illustrates an example of the pixel configuration of an OCB-mode liquid crystal device according to the third exemplary embodiment of the invention; or, more specifically, FIG. 8A shows a plan view thereof as viewed from the counter-substrate (30) side whereas FIG. 8B shows a sectional view taken along the line VIIIB-VIIIB of FIG. 8A. As illustrated in FIG. 8A, in the configuration of the liquid crystal device 1 according to the third exemplary embodiment of the invention, the gate line 12 has no bent portion. On the other hand, as illustrated therein, each of the source lines 14a and 14b has V-shaped bent portions 52. Two sides of the pixel electrode 16a that extend along the source lines 14a and 14b, respectively, are bent in the shape of an alphabet V along the V-bent portions 52 of the source lines 14a and 14b, respectively. The source line 14a has two bent portions 52 corresponding to one source-line-adjacent side of the pixel electrode 16a. In like manner, the source line 14b has two bent portions 52 corresponding to the other source-line-adjacent side of the pixel electrode 16a. In order to cause transition in the orientation state of the liquid crystal layer 40 from the initial splay alignment to the bend alignment, as a first step of the orientation-state transition operation thereof, a transition voltage is applied between the source line 14a and the pixel electrode 16a.

As illustrated in FIG. 8A, the pixel electrode 16a is formed between the above-mentioned two source lines 14a and 14b. As further illustrated therein, the pixel electrode 16a partially overlaps the source line 14b in a plan view. It should be noted that the pixel electrode 16a does not overlap the source line 14a at all in a plan view. The source line 14a is electrically connected to the pixel electrode 16a via the TFT element 20, whereas the source line 14b is not electrically connected to the pixel electrode 16a via the TFT element 20 (but electrically connected to another pixel electrode). That is, as shown in the plan view of FIG. 8A, a partial region of the pixel electrode 16a overlaps a part of the source line 14b, which is shown (formed) as a right-side source line as viewed in two dimensions from the pixel electrode 16a on the sheet of the drawing. On the other hand, no region of the pixel electrode 16a overlaps the source line 14a, which is shown as a left-side source line as viewed in two dimensions from the pixel electrode 16a on the sheet of the drawing. The source line 14b, which partially overlaps the pixel electrode 16a in a plan view, is not electrically connected to the pixel electrode 16a. Since the source line 14b is not electrically connected to the pixel electrode 16a, it is possible to reduce adverse effects of any parasitic capacitance on image display even if the parasitic capacitance is generated due to the overlap of the source line 14b and the pixel electrode 16a.

The source line 14b is formed between two pixel electrodes 16a and 16b that are arrayed adjacent to each other. As illustrated in (FIG. 8A or) FIG. 8B, the source line 14b partially overlaps the pixel electrode 16a (in a plan view). Note that the source line 14a does not overlap the pixel electrode 16a at all. In the configuration of the liquid crystal device 1 according to the third exemplary embodiment of the invention described above, the partial overlap region at which the source line 14 and the pixel electrode 16 partially overlap each other is formed in a limited area; or, more specifically, in the illustrated exemplary configuration of the liquid crystal device 1 according to the third exemplary embodiment of the invention described above, it is formed only at one side thereof. With such a structure, it is possible to reduce parasitic capacitance that is generated due to the overlap of the source line 14 and the pixel electrode 16.

In addition, at the partial overlap region where the source line 14 and the pixel electrode 16 partially overlap each other, it is possible to produce the same advantageous effects as those offered by the liquid crystal device 1 according to the foregoing first exemplary embodiment of the invention. That is, if the configuration of the liquid crystal device 1 according to the present embodiment of the invention is adopted, at the partial overlap region where the source line 14 and the pixel electrode 16 partially overlap each other, it is possible to create splay-to-bend transition nuclei with a lower transition voltage in the first step of the orientation-state transition operation thereof; and in addition thereto, it is further possible to spread the bend alignment area with a lower transition voltage in the second step of the orientation-state transition operation thereof. For this reason, it is possible to reduce power that is consumed by the liquid crystal device 1 for the orientation-state transition from the splay alignment to the bend alignment. In addition, it is possible to use/adopt a lower voltage-resistant driving circuit for image-display operation.

Variation Example of Third Embodiment

The configuration of the liquid crystal device 1 according to the third exemplary embodiment of the invention described above may be combined with the configuration of the liquid crystal device 1 according to the foregoing second exemplary embodiment of the invention. In such a modified configuration of the liquid crystal device 1, a bent portion(s) is formed on each of the gate line 12 and the source line 14 along which the corresponding side of the pixel electrode 16 is shaped as a fitting bent side. In order to cause transition in the orientation state of the liquid crystal layer 40 from the initial splay alignment to the bend alignment, as a first step of the orientation-state transition operation thereof, a transition voltage is applied between the gate line 12 and the pixel electrode 16 as well as between the source line 14 and the pixel electrode 16. The pixel electrodes 16 are arrayed adjacent to one another in such a manner that each pixel electrode 16 partially overlaps the gate line 12 that does not correspond to the above-mentioned pixel electrode 16 (but corresponds to another pixel electrode) and further partially overlaps the source line 14 that is not electrically connected to the above-mentioned pixel electrode 16 (but electrically connected to another pixel electrode). With such a modified configuration of the liquid crystal device 1 according to the third exemplary embodiment of the invention described above, it is possible to generate transition nuclei at a larger number of transition nucleus generation positions 50. Accordingly, it is possible to cause the orientation-state transition from the splay alignment to the bend alignment in an easier manner.

Fourth Embodiment

Next, with reference to the accompanying drawing, the configuration of a liquid crystal device according to a fourth exemplary embodiment of the invention is explained below. The configuration of the liquid crystal device 1 according to the fourth exemplary embodiment of the invention features some modifications/alterations/variations/changes from the configuration of the liquid crystal device 1 according to the foregoing first exemplary embodiment of the invention. In the following description of a liquid crystal device according to the fourth embodiment of the invention, differences in the configuration/operation thereof from that of the liquid crystal device 1 according to the first embodiment of the invention described above are mainly explained. Therefore, in the following description of the liquid crystal device 1 according to the fourth embodiment of the invention, the same reference numerals are consistently used for the same components as those of the liquid crystal device 1 according to the first embodiment of the invention so as to omit, if appropriate, any redundant explanation or simplify explanation thereof.

Figure 9A:
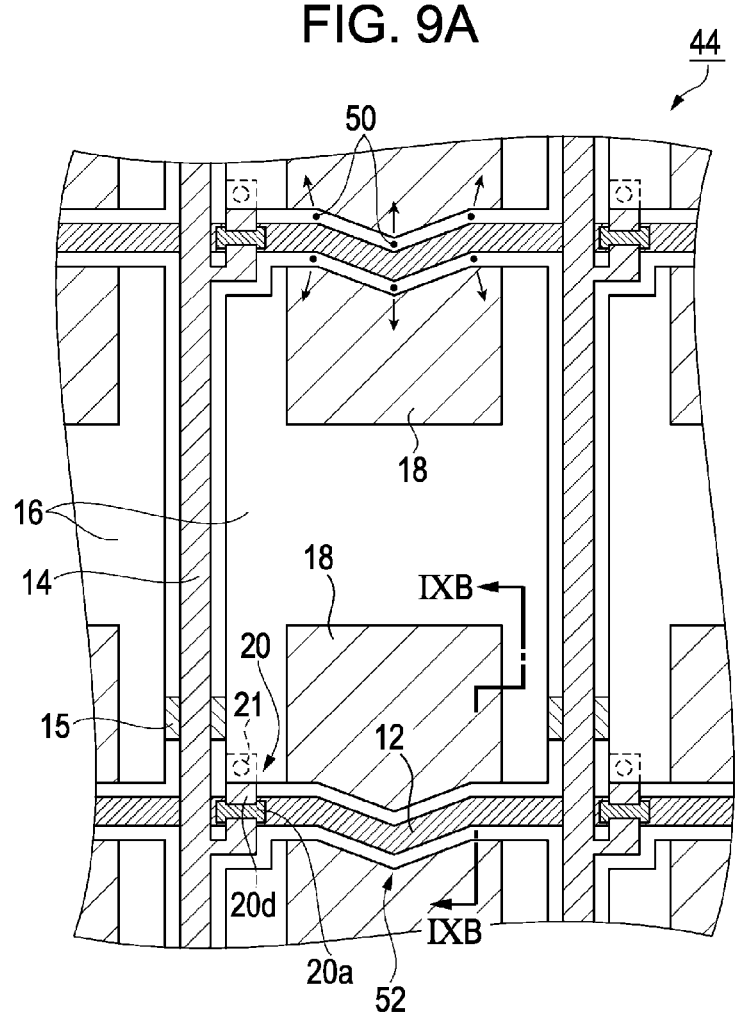
Figure 9B:
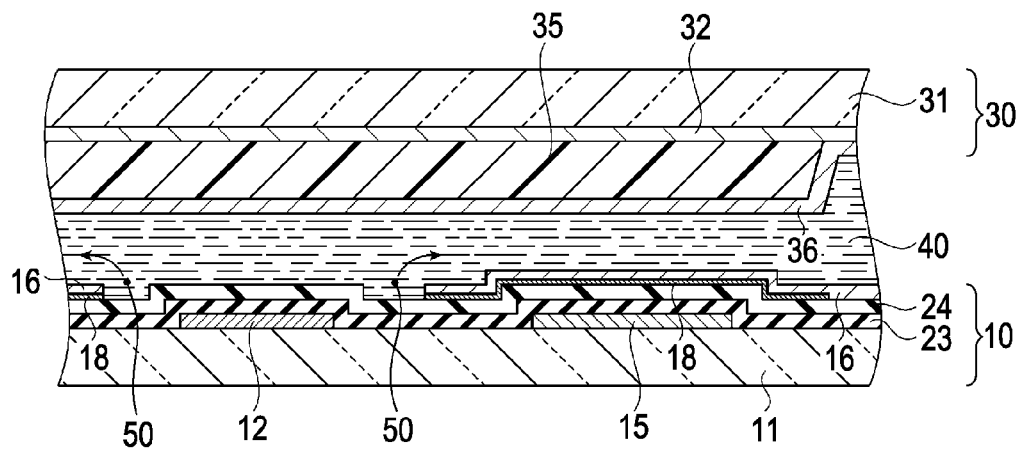
FIG. 9B shows a sectional view taken along the line IXB-IXB of FIG. 9A.

FIG. 9 is a set of diagrams that schematically illustrates an example of the pixel configuration of an OCB-mode liquid crystal device according to the fourth exemplary embodiment of the invention; or, more specifically, FIG. 9A shows a plan view thereof as viewed from the counter-substrate (30) side whereas FIG. 9B shows a sectional view taken along the line IXB-IXB of FIG. 9A. As illustrated in FIG. 9A, the pixel electrode 16 has two sides that extend along the gate lines 12 in a plan view and further has two sides that extend along the source lines 14 in a plan view. The pixel electrode 16 does not overlap any gate line 12 in a plan view. In addition, the pixel electrode 16 does not overlap any source line 14 in a plan view. The gate line 12 has a V-shaped bent portion 52. Among four sides of the pixel electrode 16, each of two sides thereof that extend along the gate lines 12 also has a V-shaped bent portion that is inflected along, or, for example, either perfectly or substantially fits with the above-mentioned V-shaped bent portion 52 of the corresponding gate line 12.

A reflective film 18 is formed at some region of the pixel electrode 16 that extends along or has a side extending along the bent portion 52 of the gate line 12 in a plan view. The reflective film 18 is made of aluminum. In the configuration of the liquid crystal device 1 according to the fourth exemplary embodiment of the invention, the reflective film 18 is formed at each of two gate-line-adjacent regions among the entire pixel-electrode region. As illustrated in FIG. 9B, the reflective film 18 is formed at the liquid-crystal-layer-side surface of the base substrate substance 11 of the element substrate 10. More specifically, the reflective film 18 is formed at a layer between the inter-bedded insulation layer 24 and the pixel electrode 16, though the layer structure of the liquid crystal device 1 according to the fourth exemplary embodiment of the invention is not limited to such an exemplary configuration. Among the entire pixel-electrode region at which the pixel electrode 16 is provided, the reflective-film region at which the reflective film 18 is provided constitutes a reflective display region (i.e., reflective display area) that contributes to reflective display. On the other hand, among the entire pixel-electrode region at which the pixel electrode 16 is provided, the non-reflective-film region at which the reflective film 18 is not provided constitutes a transmissive display region (i.e., transmissive display area) that contributes to transmissive display. At the reflective display area, an incident light beam that enters from the counter-substrate (30) side is reflected at the reflective film 18 for image display. On the other hand, an incident light beam that enters from the element-substrate (10) side is transmitted through the transmissive display area for image display.

A liquid crystal layer thickness adjustment layer 35 is formed at the liquid-crystal-side surface of the base substrate substance 31 of the counter substrate 30 at, at least, a region that overlaps the reflective film 18 in a plan view. Therefore, the liquid crystal layer thickness adjustment layer 35 is formed at, at least, the reflective display region. The liquid crystal layer thickness adjustment layer 35 is made of a resin that has light-transmitting property, though not limited thereto. For example, the liquid crystal layer thickness adjustment layer 35 made of a translucent resin is formed between the color filter 32 and the common electrode 36, though not limited thereto. The liquid crystal layer thickness adjustment layer 35 has a predetermined controlled thickness, thereby providing a layer-thickness difference in such a manner that the thickness of the liquid crystal layer 40 in the reflective display region is smaller than the thickness of the liquid crystal layer 40 in the transmissive display region. If the thickness of the liquid crystal layer 40 in the reflective display region is set as a half of the thickness of the liquid crystal layer 40 in the transmissive display region, the thickness of the liquid crystal layer 40 in the reflective display region is approximately 2.5 µm. With the layer structure described above, it is possible to make the propagation distance of an incident light beam that travels inside the liquid crystal layer 40 at the reflective display area and the propagation distance of an incident light beam that travels inside the liquid crystal layer 40 at the transmissive display area substantially equal to each other. Since the traveling distance of an incident light beam that propagates inside the liquid crystal layer 40 at the reflective display area and the traveling distance of an incident light beam that propagates inside the liquid crystal layer 40 at the transmissive display area are made substantially equal to each other, it is possible to equalize/balance the optical conditions at the reflective display area and at the transmissive display area so as to achieve optimum conditions for high-quality image display. In the illustrated exemplary configuration (refer to FIG. 9B) of the liquid crystal device 1 according to the present embodiment of the invention, the liquid crystal layer thickness adjustment layer 35 is formed at the liquid-crystal-side surface of the base substrate substance 31 of the counter substrate 30 not only at the above-mentioned reflective-film region that overlaps the reflective film 18 in a plan view but also at an inter-reflective-film region that lies, in a plan view, between two reflective films 18 arrayed adjacent to each other with the gate line 12 being interposed between the above-mentioned two reflective films 18 arrayed adjacent to each other.

In order to cause transition in the orientation state of the liquid crystal layer 40 from the initial splay alignment to the bend alignment in the illustrated exemplary configuration of the liquid crystal device 1 according to the present embodiment of the invention, as a first step thereof, a transition voltage is applied between the gate line 12 and the pixel electrode 16. As a result of the application of the transition voltage between the gate line 12 and the pixel electrode 16, splay-to-bend transition nuclei are generated at the positions (i.e., transition nucleus generation positions 50 shown in FIGS. 5A and 5B) between the gate line 12 and the pixel electrode 16 or in the neighborhood thereof as viewed in two dimensions. In order to cause transition in the orientation state of the liquid crystal layer 40 from the initial splay alignment to the bend alignment, as a second step thereof, a transition voltage is applied between the pixel electrode 16 and the common electrode 36. By this means, the splay-to-bend transition nuclei that were generated in the first step of the orientation-state transfer operation described above are spread over the entire region of the pixel electrode 16. The liquid crystal layer thickness adjustment layer 35 is provided at the transition nucleus generation positions 50 or in the vicinity thereof. Therefore, the thickness of the liquid crystal layer 40 thereat, that is, the distance between the pixel electrode 16 and the common electrode 36 is relatively small. Therefore, the strength (i.e., intensity) of an electric field that is generated in the liquid crystal layer 40 in the second step of the orientation-state transfer operation in the configuration of the liquid crystal device 1 according to the fourth exemplary embodiment of the invention is greater in comparison with the strength of an electric field that would be generated if there were not any liquid crystal layer thickness adjustment layer 35 thereat. For this reason, it is possible to spread a bend alignment area along the region at which the liquid crystal layer thickness adjustment layer 35 is formed in a speedier manner in the second step of the orientation-state transfer operation described above. Or, alternatively, it is possible to spread the bend alignment area with a lower transition voltage. For this reason, it is possible to reduce power that is consumed by the liquid crystal device 1 for the orientation-state transition from the splay alignment to the bend alignment. In addition, it is possible to use/adopt a lower voltage-resistant driving circuit for image-display operation. It is preferable that both of the reflective film 18 and the liquid crystal layer thickness adjustment layer 35 should extend to the center of the pixel electrode 16 or in the vicinity thereof in order to spread the bend alignment area over the pixel electrode 16 in a speedier manner.

Variation Examples of Fourth Embodiment

In the foregoing description of the liquid crystal device 1 according to the fourth exemplary embodiment of the invention, it is explained that the reflective film 18 and the liquid crystal layer thickness adjustment layer 35 are formed at each of two gate-line-adjacent regions among the entire pixel-electrode (16) region. However, the scope of the invention is not limited thereto. As a non-limiting modification example thereof, the reflective film 18 and the liquid crystal layer thickness adjustment layer 35 may be formed at only one of two gate-line-adjacent regions among the entire pixel-electrode (16) region.

In the foregoing description of the liquid crystal device 1 according to the fourth exemplary embodiment of the invention, it is explained that the V-shaped bent portion 52 is formed on the gate line 12 along (the V-shaped bent portion 52 of) which the reflective film 18 and the liquid crystal layer thickness adjustment layer 35 are formed. However, the scope of the invention is not limited thereto. As a non-limiting modification example thereof, a V-shaped bent portion(s) may be formed not on the gate line 12 but on the source line 14 along (the V-shaped bent portion(s) of) which the reflective film 18 and the liquid crystal layer thickness adjustment layer 35 are formed. Or, as another non-limiting modification example thereof, a V-shaped bent portion(s) may be formed both on the gate line 12 and on the source line 14. In such a modified configuration, the reflective film 18 and the liquid crystal layer thickness adjustment layer 35 are formed along each of the V-shaped bent portion(s) formed on the gate line 12 and the V-shaped bent portion(s) formed on the source line 14.

As another non-limiting modification example thereof, the gate line 12 and/or the source line 14 may not have any bent portion. Even if the gate line 12 and/or the source line 14 do not have any bent portion, the reflective film 18 and the liquid crystal layer thickness adjustment layer 35 that are formed at the region that extends along or has a side extending along the gate line 12 and/or the source line 14 make it possible to increase the intensity (i.e., strength) of an electric field that is generated in the liquid crystal layer 40. Therefore, it is possible to carry out the splay-to-bend orientation-state transition with a lower transition voltage in a speedier manner.

In the configuration of the liquid crystal device 1 according to the fourth embodiment of the invention illustrated in FIG. 9B, the pixel electrode 16, which has translucency, overlaps the reflective film 18 as viewed in two dimensions. However, the scope of the invention is not limited thereto. As a non-limiting modification example thereof, the pixel electrode 16 may be formed at a region excluding the reflective-film region at which the reflective film 18 is formed. In such a modified configuration, the pixel electrode 16 and the reflective film 18 are electrically connected to each other. By this means, it is possible to use, as a pixel electrode, the reflective-film region at which the reflective film 18 is formed. That is, if so configured, it is possible to use a composite pixel electrode that is made up of the pixel electrode 16 and the reflective film 18 as a pixel electrode. The "pixel electrode" according to the fourth embodiment of the invention includes the above-mentioned composite pixel electrode according to the variation example thereof described herein. That is, the "pixel electrode 16" according to the fourth embodiment of the invention can be read as the above-mentioned composite pixel electrode according to the variation example thereof described herein. The liquid crystal device 1 according to the variation example described herein produces the same advantageous working effects as those of the liquid crystal device 1 according to the fourth embodiment of the invention.

It is not always necessary that the liquid crystal layer thickness adjustment layer 35 should be formed at an inter-reflective-film region that lies between two reflective films 18 arrayed adjacent to each other as viewed in two dimensions. In the foregoing description of the liquid crystal device 1 according to the fourth exemplary embodiment of the invention, it is explained that the liquid crystal layer thickness adjustment layer 35 is formed at the liquid-crystal-side surface of the base substrate substance 31 of the counter substrate 30 not only at the reflective-film region that overlaps the reflective film 18 in a plan view but also at the inter-reflective-film region that lies, in a plan view, between two reflective films 18 arrayed adjacent to each other with the gate line 12 being interposed between the above-mentioned two reflective films 18 arrayed adjacent to each other. Notwithstanding the foregoing, however, the liquid crystal layer thickness adjustment layer 35, which is formed at the liquid-crystal-side surface of the base substrate substance 31 of the counter substrate 30, may not be formed at the inter-reflective-film region that lies between two reflective films 18 arrayed adjacent to each other. Even in such a modified configuration, it is possible to spread the bend alignment area along the region at which the liquid crystal layer thickness adjustment layer 35 is formed with a lower transition voltage in a speedier manner (thereby completing the orientation-state transition in a shorter time period).

Fifth Embodiment

Next, with reference to the accompanying drawing, the configuration of a liquid crystal device according to a fifth exemplary embodiment of the invention is explained below. Except that the shapes of the reflective film 18 and the liquid crystal layer thickness adjustment layer 35 as viewed in two dimensions as well as the two-dimensional layout positions thereof according to the fifth exemplary embodiment of the invention are fundamentally different from the shapes of the reflective film 18 and the liquid crystal layer thickness adjustment layer 35 as viewed in two dimensions as well as the two-dimensional layout positions thereof according to the fourth exemplary embodiment of the invention, the configuration of a liquid crystal device according to the fifth embodiment of the invention described below is fundamentally the same as the configuration of a liquid crystal device according to the fourth embodiment of the invention described above.

Figure 10A:
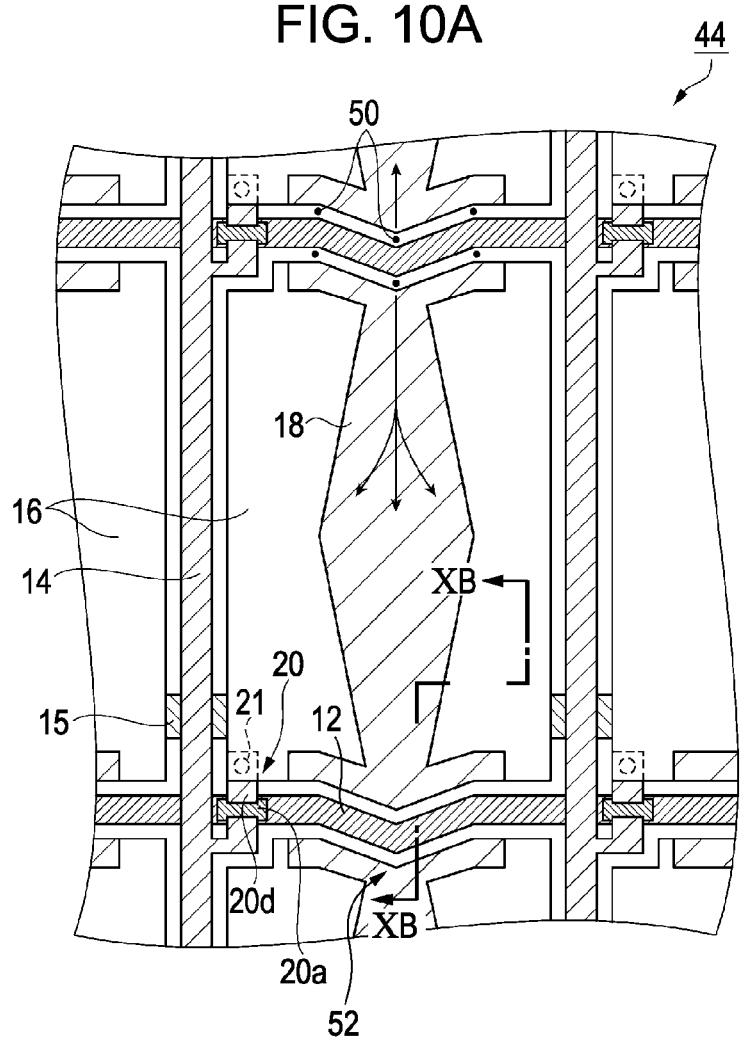
Figure 10B:
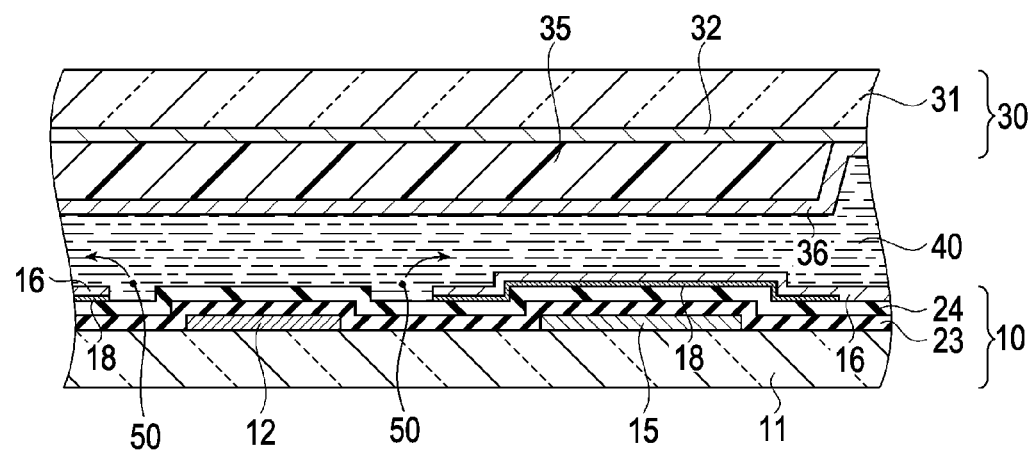
FIG. 10B shows a sectional view taken along the line XB-XB of FIG. 10A.

FIG. 10 is a set of diagrams that schematically illustrates an example of the pixel configuration of an OCB-mode liquid crystal device according to the fifth exemplary embodiment of the invention; or, more specifically, FIG. 10A shows a plan view thereof as viewed from the counter-substrate (30) side whereas FIG. 10B shows a sectional view taken along the line XB-XB of FIG. 10A. In the configuration of the liquid crystal device 1 according to the fifth exemplary embodiment of the invention, as illustrated in FIG. 10A, the gate line 12 has a V-shaped bent portion 52. As further illustrated therein, among four sides of the pixel electrode 16, each of two sides thereof that extend along the gate lines 12 also has a V-shaped bent portion that is inflected along, or, for example, either perfectly or substantially fits with the above-mentioned V-shaped bent portion 52 of the corresponding gate line 12. As shown in FIG. 10A, the reflective film 18, which is a single non-separated film, extends from one of the above-mentioned two sides of the pixel electrode 16 that extend along the gate lines 12 to the other opposite side thereof. The liquid crystal layer thickness adjustment layer 35 (refer to FIG. 10B) is formed at the liquid-crystal-side surface of the base substrate substance 31 of the counter substrate 30 at, at least, a region that overlaps the reflective film 18 in a plan view. Therefore, the reflective film 18 and the liquid crystal layer thickness adjustment layer 35 are formed in such a manner that they extend from the bent portion of the top (bottom) side of the pixel electrode 16 to the bent portion of the bottom (top) side thereof as illustrated in the plan view of FIG. 10A. The region at which the reflective film 18 and the liquid crystal layer thickness adjustment layer 35 are formed has an elongated diamond-shaped pattern, the width of which gradually varies. Specifically, because of such an elongated diamond (i.e., width-increasing, or width-varied) structure, the width of the region at which the reflective film 18 and the liquid crystal layer thickness adjustment layer 35 are formed becomes larger as it is measured at a more distant width measurement position away from (i.e., as viewed from) each of the above-mentioned two V-bent sides of the pixel electrode 16. As a non-limiting exemplary configuration thereof, as shown in FIG. 10A, the width of the region at which the reflective film 18 and the liquid crystal layer thickness adjustment layer 35 are formed that is measured at the peripheral region of the pixel electrode 16 is relatively small in comparison with the width of the region at which the reflective film 18 and the liquid crystal layer thickness adjustment layer 35 are formed that is measured at the central region of the pixel electrode 16. That is, in the illustrated exemplary configuration of the liquid crystal device 1 according to the present embodiment of the invention, the region at which the reflective film 18 and the liquid crystal layer thickness adjustment layer 35 are formed has an elongated diamond-shaped pattern/structure, the width of which gradually increases toward the center of the pixel electrode 16. Note that the scope of the invention according to the present embodiment thereof is not limited to such an illustrated exemplary configuration. In the illustrated exemplary configuration (refer to FIG. 10B) of the liquid crystal device 1 according to the present embodiment of the invention, the liquid crystal layer thickness adjustment layer 35 is formed at the liquid-crystal-side surface of the base substrate substance 31 of the counter substrate 30 not only at the above-mentioned reflective-film region that overlaps the reflective film 18 in a plan view but also at an inter-reflective-film region that lies, in a plan view, between two reflective films 18 arrayed adjacent to each other with the gate line 12 being interposed between the above-mentioned two reflective films 18 arrayed adjacent to each other.

At the time of orientation-state transition operation, a bend alignment area spreads faster at the region where the reflective film 18 and the liquid crystal layer thickness adjustment layer 35 are formed because the thickness of the liquid crystal layer 40 is relatively small thereat. For this reason, it is possible to complete the spreading of the bend alignment area to the center region of the pixel electrode 16 in a shorter time period. The bend alignment area tends to spread over the pixel electrode 16 along the elongated diamond-shaped portion of the region at which the reflective film 18 and the liquid crystal layer thickness adjustment layer 35 are formed. Therefore, the bend alignment area, which spreads from the vicinity/neighborhood of each of the above-mentioned two sides of the pixel electrode 16 toward the central region of the pixel electrode 16, has a spreading velocity component that is parallel to each of the above-mentioned two gate-line-adjacent sides of the pixel electrode 16 at the center of the pixel electrode 16 and in the vicinity/neighborhood thereof. Or, in other words, at the center of the pixel electrode 16 and in the vicinity/neighborhood thereof, the bend alignment area has a spreading velocity component that is parallel to the gate line 12. A trifurcated arrow shown in FIG. 10A indicates a non-limiting example of the spreading paths (i.e., trajectories) of the bend alignment area. Accordingly, even when the bend alignment area spreads over a region at which the reflective film 18 and the liquid crystal layer thickness adjustment layer 35 are not formed, it does so while having the above-described spreading velocity component. Therefore, the configuration of the liquid crystal device 1 according to the fifth exemplary embodiment of the invention described above makes it possible to spread the bend alignment area over the entire region of the pixel electrode 16 in a short period of time.

Sixth Embodiment

Next, with reference to the accompanying drawing, the configuration of a liquid crystal device according to a sixth exemplary embodiment of the invention is explained below. Except that the shapes of the gate line 12, the source line 14, the pixel electrode 16, the reflective film 18, and the liquid crystal layer thickness adjustment layer 35 as viewed in two dimensions as well as the two-dimensional layout positions thereof according to the sixth exemplary embodiment of the invention are fundamentally different from the shapes of the gate line 12, the source line 14, the pixel electrode 16, the reflective film 18, and the liquid crystal layer thickness adjustment layer 35 as viewed in two dimensions as well as the two-dimensional layout positions thereof according to the fifth exemplary embodiment of the invention, the configuration of a liquid crystal device according to the sixth embodiment of the invention described below is fundamentally the same as the configuration of a liquid crystal device according to the fifth embodiment of the invention described above.

Figure 11A:
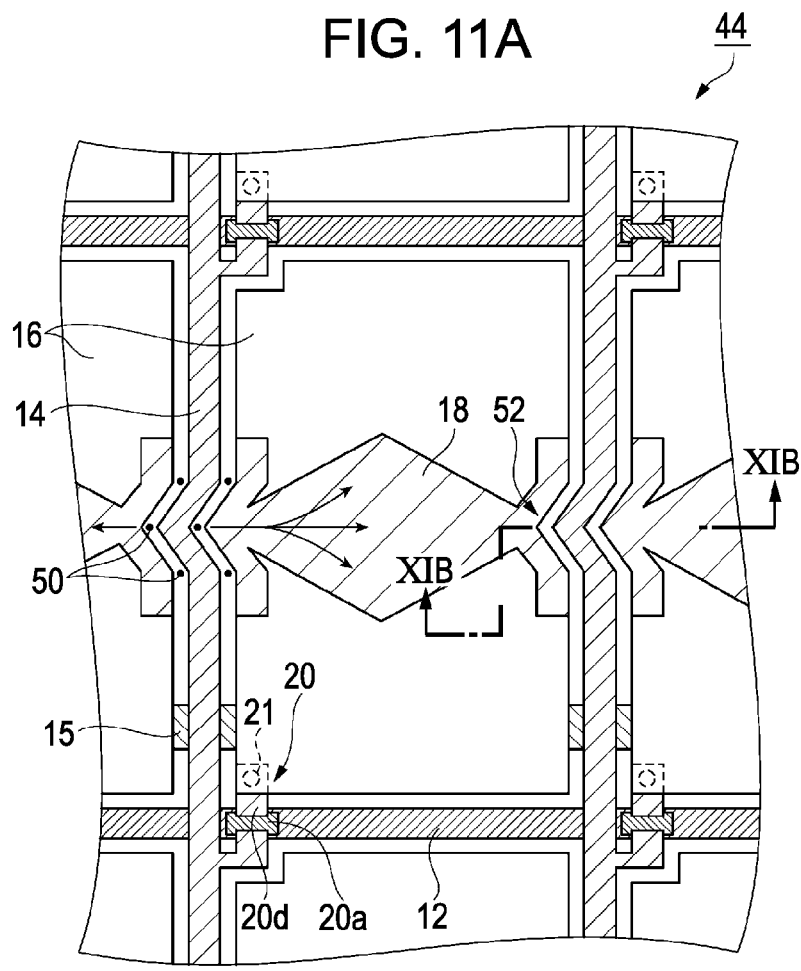
Figure 11B:
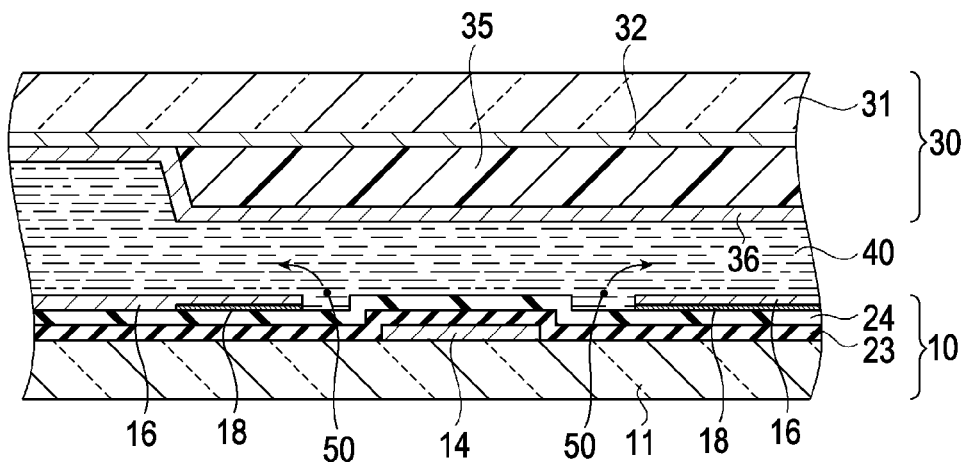
FIG. 11B shows a sectional view taken along the line XIB-XIB of FIG. 11A.

FIG. 11 is a set of diagrams that schematically illustrates an example of the pixel configuration of an OCB-mode liquid crystal device according to the sixth exemplary embodiment of the invention; or, more specifically, FIG. 11A shows a plan view thereof as viewed from the counter-substrate (30) side whereas FIG. 11B shows a sectional view taken along the line XIB-XIB of FIG. 11A. As illustrated in FIG. 11A, in the configuration of the liquid crystal device 1 according to the sixth exemplary embodiment of the invention, the gate line 12 has no bent portion. On the other hand, as illustrated therein, the source line 14 has a V-shaped bent portion 52. Two sides of the pixel electrode 16 that extend along the source lines 14, respectively, are bent in the shape of an alphabet V along the V-bent portions 52 of the source lines 14, respectively. In order to cause transition in the orientation state of the liquid crystal layer 40 from the initial splay alignment to the bend alignment, as a first step of the orientation-state transition operation thereof, a transition voltage is applied between the source line 14 and the pixel electrode 16.

The reflective film 18 is formed in such a manner that it extends from the bent portion of one side of the pixel electrode 16 that extends along the source line 14 to the bent portion of the other (i.e., opposite) side of the pixel electrode 16 that extends along the source line 14. The liquid crystal layer thickness adjustment layer 35 (refer to FIG. 11B) is formed at the liquid-crystal-side surface of the base substrate substance 31 of the counter substrate 30 at, at least, a region that overlaps the reflective film 18 in a plan view. The region at which the reflective film 18 and the liquid crystal layer thickness adjustment layer 35 are formed has a diamond-shaped portion, the width of which gradually varies. Specifically, because of such a diamond-shaped structure, the width of the region at which the reflective film 18 and the liquid crystal layer thickness adjustment layer 35 are formed becomes larger as it is measured at a more distant width measurement position away from each of the above-mentioned two V-bent sides of the pixel electrode 16. As a non-limiting exemplary configuration thereof, as shown in FIG. 11A, the width of the region at which the reflective film 18 and the liquid crystal layer thickness adjustment layer 35 are formed that is measured at the peripheral region of the pixel electrode 16 is relatively small in comparison with the width of the region at which the reflective film 18 and the liquid crystal layer thickness adjustment layer 35 are formed that is measured at the central region of the pixel electrode 16. That is, in the illustrated exemplary configuration of the liquid crystal device 1 according to the present embodiment of the invention, the region at which the reflective film 18 and the liquid crystal layer thickness adjustment layer 35 are formed has a diamond-shaped pattern/structure, the width of which gradually increases toward the center of the pixel electrode 16. Note that the scope of the invention according to the present embodiment thereof is not limited to such an illustrated exemplary configuration. In the illustrated exemplary configuration (refer to FIG. 11B) of the liquid crystal device 1 according to the present embodiment of the invention, the liquid crystal layer thickness adjustment layer 35 is formed at the liquid-crystal-side surface of the base substrate substance 31 of the counter substrate 30 not only at the above-mentioned reflective-film region that overlaps the reflective film 18 in a plan view but also at an inter-reflective-film region that lies, in a plan view, between two reflective films 18 arrayed adjacent to each other with the source line 14 being interposed between the above-mentioned two reflective films 18 arrayed adjacent to each other.

For this reason, with the configuration of the liquid crystal device 1 according to the present embodiment of the invention, it is possible to offer the same advantage as that of the foregoing fifth exemplary embodiment of the invention; that is, at the time of orientation-state transition operation, it is possible to complete the spreading of the bend alignment area to the center region of the pixel electrode 16 in a shorter time period. The bend alignment area, which spreads from the vicinity/neighborhood of each of the above-mentioned two sides of the pixel electrode 16, which extend along the source lines 14, toward the central region of the pixel electrode 16, has a spreading velocity component that is parallel to each of the above-mentioned two source-line-adjacent sides of the pixel electrode 16 at the center of the pixel electrode 16 and in the vicinity/neighborhood thereof. Or, in other words, at the center of the pixel electrode 16 and in the vicinity/neighborhood thereof, the bend alignment area has a spreading velocity component that is parallel to the source line 14. A trifurcated arrow shown in FIG. 11A indicates a non-limiting example of the spreading paths (i.e., trajectories) of the bend alignment area. Accordingly, even when the bend alignment area spreads over a region at which the reflective film 18 and the liquid crystal layer thickness adjustment layer 35 are not formed, it does so while having the above-described spreading velocity component. Therefore, the configuration of the liquid crystal device 1 according to the sixth exemplary embodiment of the invention described above makes it possible to spread the bend alignment area over the entire region of the pixel electrode 16 in a short period of time.

Variation Example of Sixth Embodiment

The configuration of the liquid crystal device 1 according to the sixth exemplary embodiment of the invention described above may be combined with the configuration of the liquid crystal device 1 according to the foregoing fifth exemplary embodiment of the invention. In such a modified configuration of the liquid crystal device 1, a bent portion is formed on each of the gate line 12 and the source line 14 along which the corresponding side of the pixel electrode 16 is shaped as a fitting bent side. In order to cause transition in the orientation state of the liquid crystal layer 40 from the initial splay alignment to the bend alignment, as a first step of the orientation-state transition operation thereof, a transition voltage is applied between the gate line 12 and the pixel electrode 16 as well as between the source line 14 and the pixel electrode 16. The reflective film 18 and the liquid crystal layer thickness adjustment layer 35 are formed in such a manner that they extend from the bent portion of one side of the pixel electrode 16 that extends along the gate line 12 to the bent portion of the other opposite side of the pixel electrode 16 that extends along the gate line 12 and further in such a manner that they extend from the bent portion of one side of the pixel electrode 16 that extends along the source line 14 to the bent portion of the other opposite side of the pixel electrode 16 that extends along the source line 14. That is, the reflective film 18 and the liquid crystal layer thickness adjustment layer 35 are formed in a cross pattern, which extends from the bent portion of the top (bottom) side of the pixel electrode 16 that extends along the gate line 12 to the bent portion of the bottom (top) side of the pixel electrode 16 that extends along the gate line 12 and further extends from the bent portion of the left (right) side of the pixel electrode 16 that extends along the source line 14 to the bent portion of the right (left) side of the pixel electrode 16 that extends along the source line 14. With such a modified configuration of the liquid crystal device 1 according to the sixth exemplary embodiment of the invention described above, it is possible to generate transition nuclei at a larger number of transition nucleus generation positions 50. Accordingly, it is possible to cause the orientation-state transition from the splay alignment to the bend alignment in an easier manner. In addition, it is possible to complete the orientation-state transition from the splay alignment to the bend alignment in a short period of time.

Seventh Embodiment

Next, with reference to the accompanying drawing, the configuration of a liquid crystal device according to a seventh exemplary embodiment of the invention is explained below. Except that the relative positions of the gate line 12, the pixel electrode 16, the reflective film 18, and the liquid crystal layer thickness adjustment layer 35 as viewed in two dimensions according to the seventh exemplary embodiment of the invention are fundamentally different from the relative positions of the gate line 12, the pixel electrode 16, the reflective film 18, and the liquid crystal layer thickness adjustment layer 35 as viewed in two dimensions according to the fourth exemplary embodiment of the invention, the configuration of a liquid crystal device according to the seventh embodiment of the invention described below is fundamentally the same as the configuration of a liquid crystal device according to the fourth embodiment of the invention described above.

Figure 12A:
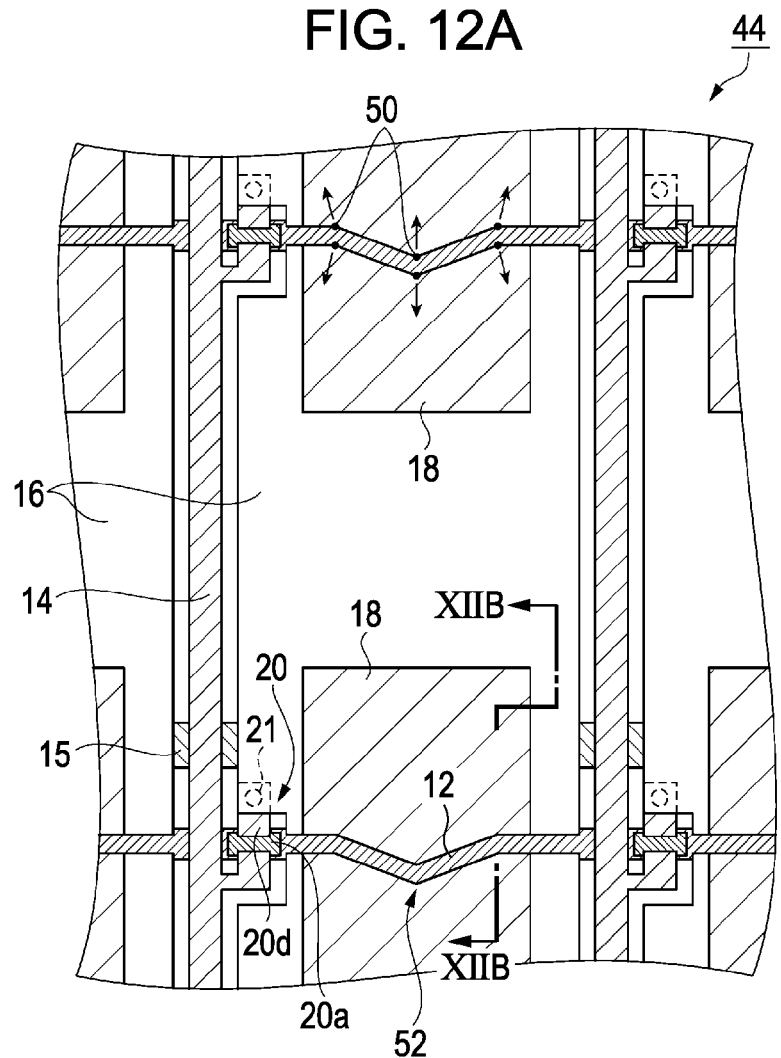
Figure 12B:
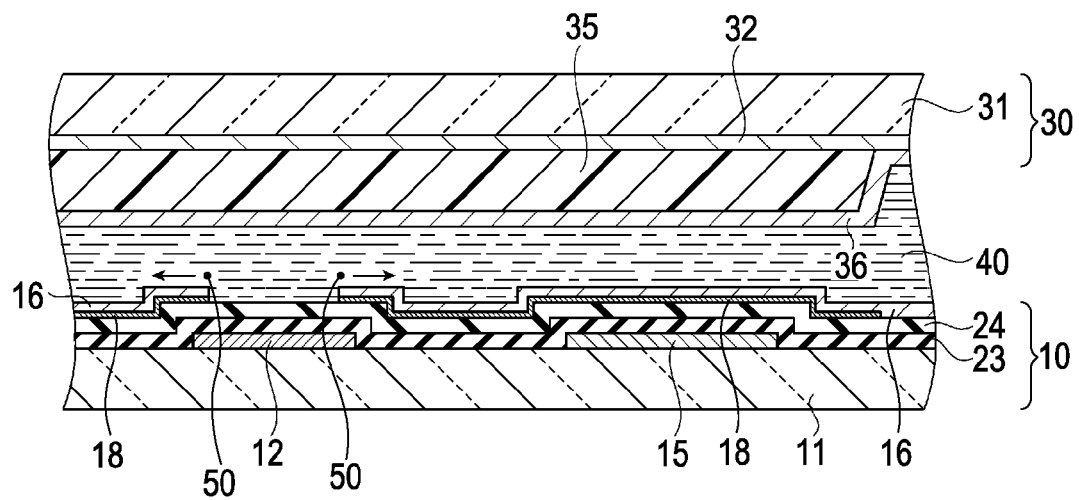
FIG. 12B shows a sectional view taken along the line XIIB-XIIB of FIG. 12A.

FIG. 12 is a set of diagrams that schematically illustrates an example of the pixel configuration of an OCB-mode liquid crystal device according to the seventh exemplary embodiment of the invention; or, more specifically, FIG. 12A shows a plan view thereof as viewed from the counter-substrate (30) side whereas FIG. 12B shows a sectional view taken along the line XIIB-XIIB of FIG. 12A. As illustrated in FIG. 12A, the gate line 12 has a V-shaped bent portion 52. Among four sides of the pixel electrode 16, each of two sides thereof that extend along the gate lines 12 also has a V-shaped bent portion that is inflected along, or, for example, either perfectly or substantially fits with the above-mentioned V-shaped bent portion 52 of the corresponding gate line 12. The edge region of the pixel electrode 16 is very slightly protruded toward, for example, the centerline (though not limited thereto) of the gate line 12 in such a manner that the above-mentioned each of two sides of the pixel electrode 16 that has the above-mentioned V-shaped bent portion that is inflected along, or, for example, either perfectly or substantially fits with the above-mentioned V-shaped bent portion 52 of the corresponding gate line 12 overlaps a part of the corresponding gate line 12 as viewed in two dimensions. Therefore, in the configuration of the liquid crystal device 1 according to the seventh exemplary embodiment of the invention, not only a part of the pixel electrode 16 but also a part of the reflective film 18 overlaps a part of the gate line 12 in a plan view.

With the configuration of the liquid crystal device 1 according to the seventh exemplary embodiment of the invention described above, it is possible to obtain the same advantageous effects as those of the foregoing first exemplary embodiment of the invention in combination with the same advantageous effects as those of the foregoing fourth exemplary embodiment of the invention. At the time when a transition voltage is applied between the gate line 12 and the pixel electrode 16, an electric field that contains large vertical electric-field component is generated in the liquid crystal layer 40. Therefore, the orientation state thereof changes more easily from the splay alignment to the bend alignment. In addition, the generation of an electric field that has a relatively large vertical electric-field component facilitates the generation of splay-to-bend transition nuclei at the transition nucleus generation positions 50. At each overlapping area at which the gate line 12 and the pixel electrode 16 (and the reflective film 18) overlap each other, at least a portion of a transition nucleus is generated over the edge of the pixel electrode 16. Therefore, at the time when the bend alignment area spreads over the pixel electrode 16 from the initial starting point of the transition nucleus, it is not necessary for it to climb over the pixel electrode 16. Or, in other words, at the time when the bend alignment area spreads over the pixel electrode 16 from the initial starting point of the transition nucleus, it is not necessary for the bend alignment area to overcome a large level difference. For this reason, it is possible to spread the bend alignment area over the pixel electrode 16 with a lower transition voltage. The reflective film 18 and the liquid crystal layer thickness adjustment layer 35 are provided at the transition nucleus generation positions 50 or in the vicinity thereof. Therefore, the thickness of the liquid crystal layer 40 thereat, that is, the distance between the pixel electrode 16 and the common electrode 36 is relatively small. For this reason, it is possible to increase the strength of an electric field that is generated in the liquid crystal layer 40 as a result of the application of a transition voltage. Thus, it is further possible to spread the bend alignment area with a lower transition voltage in a short period of time.

Eighth Embodiment

Next, with reference to the accompanying drawing, the configuration of a liquid crystal device according to an eighth exemplary embodiment of the invention is explained below. Except that the shapes of the reflective film 18 and the liquid crystal layer thickness adjustment layer 35 as viewed in two dimensions as well as the two-dimensional layout positions thereof according to the eighth exemplary embodiment of the invention are fundamentally different from the shapes of the reflective film 18 and the liquid crystal layer thickness adjustment layer 35 as viewed in two dimensions as well as the two-dimensional layout positions thereof according to the seventh exemplary embodiment of the invention, the configuration of a liquid crystal device according to the eighth embodiment of the invention described below is fundamentally the same as the configuration of a liquid crystal device according to the seventh embodiment of the invention described above.

Figure 13A:
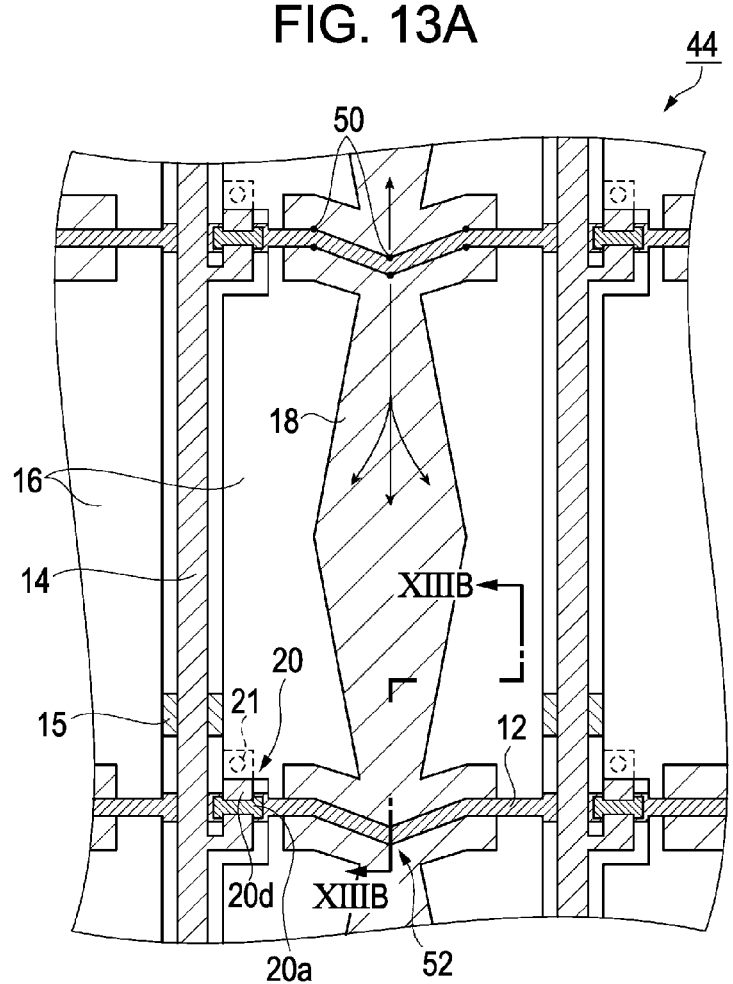
Figure 13B:
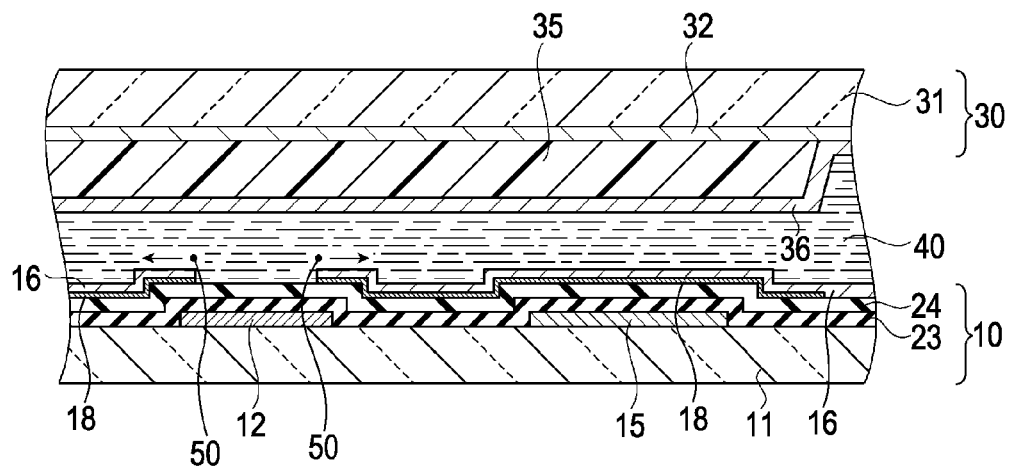
FIG. 13B shows a sectional view taken along the line XIIIB-XIIIB of FIG. 13A.

FIG. 13 is a set of diagrams that schematically illustrates an example of the pixel configuration of an OCB-mode liquid crystal device according to the eighth exemplary embodiment of the invention; or, more specifically, FIG. 13A shows a plan view thereof as viewed from the counter-substrate (30) side whereas FIG. 13B shows a sectional view taken along the line XIIIB-XIIIB of FIG. 13A. In the configuration of the liquid crystal device 1 according to the eighth exemplary embodiment of the invention, as illustrated in FIG. 13A, the gate line 12 has a V-shaped bent portion 52. As further illustrated therein, among four sides of the pixel electrode 16, each of two sides thereof that extend along the gate lines 12 also has a V-shaped bent portion that is inflected along, or, for example, either perfectly or substantially fits with the above-mentioned V-shaped bent portion 52 of the corresponding gate line 12. As shown in FIG. 13A, the reflective film 18, which is a single non-separated film, extends from one of the above-mentioned two sides of the pixel electrode 16 that extend along the gate lines 12 to the other opposite side thereof. The liquid crystal layer thickness adjustment layer 35 (refer to FIG. 13B) is formed at the liquid-crystal-side surface of the base substrate substance 31 of the counter substrate 30 at, at least, a region that overlaps the reflective film 18 in a plan view. Therefore, the reflective film 18 and the liquid crystal layer thickness adjustment layer 35 are formed in such a manner that they extend from the bent portion of the top (bottom) side of the pixel electrode 16 to the bent portion of the bottom (top) side thereof as illustrated in the plan view of FIG. 13A. The region at which the reflective film 18 and the liquid crystal layer thickness adjustment layer 35 are formed has an elongated diamond-shaped pattern, the width of which gradually varies. Specifically, because of such an elongated diamond (i.e., width-increasing, or width-varied) structure, the width of the region at which the reflective film 18 and the liquid crystal layer thickness adjustment layer 35 are formed becomes larger as it is measured at a more distant width measurement position away from (i.e., as viewed from) each of the above-mentioned two V-bent sides of the pixel electrode 16. As a non-limiting exemplary configuration thereof, as shown in FIG. 13A, the width of the region at which the reflective film 18 and the liquid crystal layer thickness adjustment layer 35 are formed that is measured at the peripheral region of the pixel electrode 16 is relatively small in comparison with the width of the region at which the reflective film 18 and the liquid crystal layer thickness adjustment layer 35 are formed that is measured at the central region of the pixel electrode 16. That is, in the illustrated exemplary configuration of the liquid crystal device 1 according to the present embodiment of the invention, the region at which the reflective film 18 and the liquid crystal layer thickness adjustment layer 35 are formed has an elongated diamond-shaped pattern/structure, the width of which gradually increases toward the center of the pixel electrode 16. Note that the scope of the invention according to the present embodiment thereof is not limited to such an illustrated exemplary configuration. In the illustrated exemplary configuration (refer to FIG. 13B) of the liquid crystal device 1 according to the present embodiment of the invention, the liquid crystal layer thickness adjustment layer 35 is formed at the liquid-crystal-side surface of the base substrate substance 31 of the counter substrate 30 not only at the above-mentioned reflective-film region that overlaps the reflective film 18 in a plan view but also at an inter-reflective-film region that lies, in a plan view, between two reflective films 18 arrayed adjacent to each other with the gate line 12 being interposed between the above-mentioned two reflective films 18 arrayed adjacent to each other.

With the configuration of the liquid crystal device 1 according to the present embodiment of the invention described above, it is possible to offer the same advantage as that of the foregoing fifth or sixth exemplary embodiment of the invention; that is, at the time of orientation-state transition operation, it is possible to complete the spreading of the bend alignment area to the center region of the pixel electrode 16 in a shorter time period. The bend alignment area, which spreads from the vicinity/neighborhood of each of the above-mentioned two sides of the pixel electrode 16 toward the central region of the pixel electrode 16, has a spreading velocity component that is parallel to each of the above-mentioned two gate-line-adjacent sides of the pixel electrode 16 at the center of the pixel electrode 16 and in the vicinity/neighborhood thereof. Or, in other words, at the center of the pixel electrode 16 and in the vicinity/neighborhood thereof, the bend alignment area has a spreading velocity component that is parallel to the gate line 12. A trifurcated arrow shown in FIG. 13A indicates a non-limiting example of the spreading paths, that is, trajectories of the bend alignment area. Accordingly, even when the bend alignment area spreads over a region at which the reflective film 18 and the liquid crystal layer thickness adjustment layer 35 are not formed, it does so while having the above-described spreading velocity component. Therefore, the configuration of the liquid crystal device 1 according to the eighth exemplary embodiment of the invention described above makes it possible to spread the bend alignment area over the entire region of the pixel electrode 16 in a short period of time.

Moreover, since the gate line 12 and the pixel electrode 16 partially overlap each other in the configuration of the liquid crystal device 1 according to the present embodiment of the invention, at the partial overlap region where the gate line 12 and the pixel electrode 16 partially overlap each other, it is possible to create splay-to-bend transition nuclei with a lower transition voltage in the first step of the orientation-state transition operation thereof; and in addition thereto, it is further possible to spread the bend alignment area in an easier manner in the second step of the orientation-state transition operation thereof.

Ninth Embodiment

Next, with reference to the accompanying drawing, the configuration of a liquid crystal device according to a ninth exemplary embodiment of the invention is explained below.

Except that the shapes of the reflective film 18 and the liquid crystal layer thickness adjustment layer 35 as viewed in two dimensions as well as the two-dimensional layout positions thereof according to the ninth exemplary embodiment of the invention are fundamentally different from the shapes of the reflective film 18 and the liquid crystal layer thickness adjustment layer 35 as viewed in two dimensions as well as the two-dimensional layout positions thereof according to the eighth exemplary embodiment of the invention, the configuration of a liquid crystal device according to the ninth embodiment of the invention described below is fundamentally the same as the configuration of a liquid crystal device according to the eighth embodiment of the invention described above.

Figure 14A:
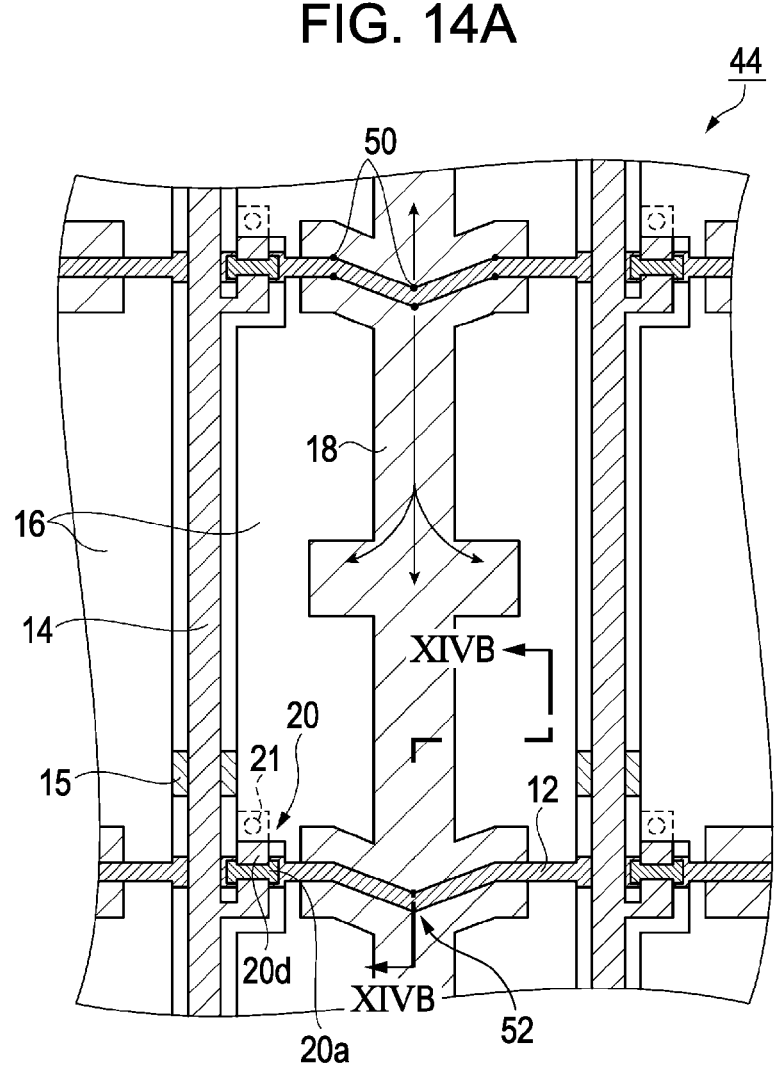
Figure 14B:
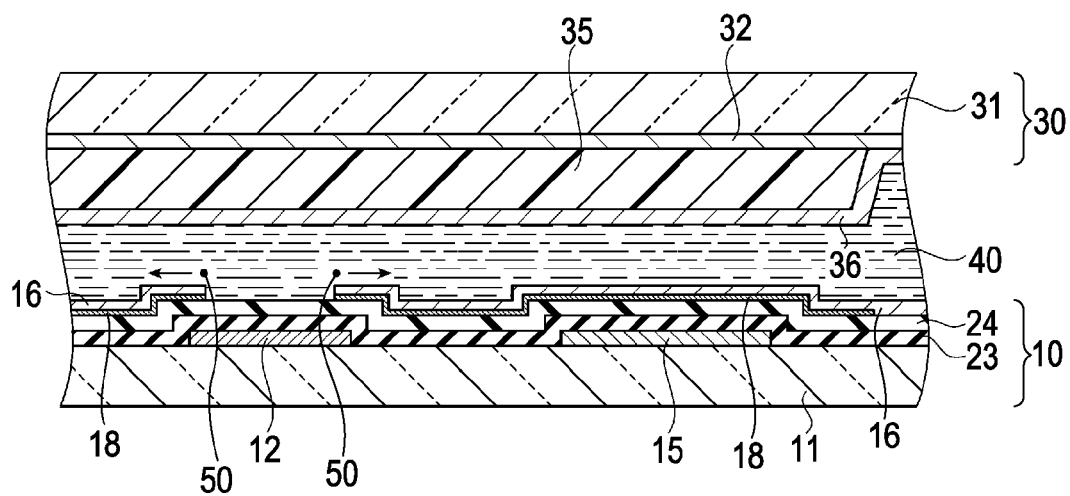
FIG. 14B shows a sectional view taken along the line XIVB-XIVB of FIG. 14A.

FIG. 14 is a set of diagrams that schematically illustrates an example of the pixel configuration of an OCB-mode liquid crystal device according to the ninth exemplary embodiment of the invention; or, more specifically, FIG. 14A shows a plan view thereof as viewed from the counter-substrate (30) side whereas FIG. 14B shows a sectional view taken along the line XIVB-XIVB of FIG. 14A. In the configuration of the liquid crystal device 1 according to the ninth exemplary embodiment of the invention, as illustrated in FIG. 14A, the gate line 12 has a V-shaped bent portion 52. As further illustrated therein, among four sides of the pixel electrode 16, each of two sides thereof that extend along the gate lines 12 also has a V-shaped bent portion that is inflected along, or, for example, either perfectly or substantially fits with the above-mentioned V-shaped bent portion 52 of the corresponding gate line 12. As shown in FIG. 14A, the reflective film 18, which is a single non-separated film, extends from the bent portion of one side of the pixel electrode 16 that extends along the gate line 12 to the bent portion of the other opposite side of the pixel electrode 16 that extends along the gate line 12. At the central region of the pixel electrode 16, the reflective film 18 has a band-like protruding portion that "intersects with" the above-described bent-to-bent extending portion thereof. The liquid crystal layer thickness adjustment layer 35 (refer to FIG. 14B) is formed at the liquid-crystal-side surface of the base substrate substance 31 of the counter substrate 30 at, at least, a region that overlaps the reflective film 18 in a plan view. More specifically, the reflective film 18 and the liquid crystal layer thickness adjustment layer 35 are formed in such a manner that they mainly extend from the bent portion of the top (bottom) side of the pixel electrode 16 to the bent portion of the bottom (top) side thereof as illustrated in the plan view of FIG. 14A. The bent-to-bent extending portion thereof is parallel to the source lines 14. Furthermore, the above-described band-like protruding portion thereof extends from the bent-to-bent extending portion thereof at the central region of the pixel electrode 16 in such a manner that the former and the latter cross each other thereat. The band-like protruding portion thereof, which extends from the left (right) to the right (left) in the plan view of FIG. 14A, is parallel to the gate lines 12. Or, in other words, the reflective film 18 and the liquid crystal layer thickness adjustment layer 35 are formed in such a region that has the shape of a cross at the central region of the pixel electrode 16. The configuration of the liquid crystal device 1 according to the ninth exemplary embodiment of the invention described herein is one non-limiting example/embodiment of the above-described width-varied pattern/structure. That is, in the configuration of the liquid crystal device 1 according to the ninth exemplary embodiment of the invention described herein, the region at which the reflective film 18 and the liquid crystal layer thickness adjustment layer 35 are formed has a larger-width portion. Specifically, the width of the region at which the reflective film 18 and the liquid crystal layer thickness adjustment layer 35 are formed that is measured at the central region of the pixel electrode 16 is larger than the width thereof measured at each of the above-mentioned two V-bent sides of the pixel electrode 16. In the illustrated exemplary configuration (refer to FIG. 14B) of the liquid crystal device 1 according to the present embodiment of the invention, the liquid crystal layer thickness adjustment layer 35 is formed at the liquid-crystal-side surface of the base substrate substance 31 of the counter substrate 30 not only at the above-mentioned reflective-film region that overlaps the reflective film 18 in a plan view but also at an inter-reflective-film region that lies, in a plan view, between two reflective films 18 arrayed adjacent to each other with the gate line 12 being interposed between the above-mentioned two reflective films 18 arrayed adjacent to each other.

With the configuration of the liquid crystal device 1 according to the present embodiment of the invention described above, it is possible to offer the same advantage as that of the foregoing fifth, sixth, or eighth exemplary embodiment of the invention; that is, at the time of orientation-state transition operation, it is possible to complete the spreading of the bend alignment area to the center region of the pixel electrode 16 in a shorter time period. The bend alignment area, which spreads along the formation region of the reflective film 18 from the vicinity/neighborhood of each of the above-mentioned two sides of the pixel electrode 16 toward the central region of the pixel electrode 16, has a spreading velocity component that is parallel to the source lines 14. At the center of the pixel electrode 16 and in the vicinity/neighborhood thereof, the bend alignment area having a spreading velocity component that is parallel to the gate line 12 spreads along the above-mentioned band-like protruding portion, which intersects with the above-mentioned bent-to-bent extending portion. A trifurcated arrow shown in FIG. 14A indicates a non-limiting example of the spreading paths, that is, trajectories of the bend alignment area. Accordingly, even when the bend alignment area spreads over a region at which the reflective film 18 and the liquid crystal layer thickness adjustment layer 35 are not formed, it does so while having the above-described spreading velocity component. Therefore, the configuration of the liquid crystal device 1 according to the ninth exemplary embodiment of the invention described above makes it possible to spread the bend alignment area over the entire region of the pixel electrode 16 in a short period of time.

Moreover, since the gate line 12 and the pixel electrode 16 partially overlap each other in the configuration of the liquid crystal device 1 according to the present embodiment of the invention, at the partial overlap region where the gate line 12 and the pixel electrode 16 partially overlap each other, it is possible to create splay-to-bend transition nuclei with a lower transition voltage in the first step of the orientation-state transition operation thereof; and in addition thereto, it is further possible to spread the bend alignment area in an easier manner in the second step of the orientation-state transition operation thereof.

Tenth Embodiment

Next, with reference to the accompanying drawing, the configuration of a liquid crystal device according to a tenth exemplary embodiment of the invention is explained below. Except that the shapes of the reflective film 18 and the liquid crystal layer thickness adjustment layer 35 as viewed in two dimensions as well as the two-dimensional layout positions thereof according to the tenth exemplary embodiment of the invention are fundamentally different from the shapes of the reflective film 18 and the liquid crystal layer thickness adjustment layer 35 as viewed in two dimensions as well as the two-dimensional layout positions thereof according to the eighth exemplary embodiment of the invention, the configuration of a liquid crystal device according to the tenth embodiment of the invention described below is fundamentally the same as the configuration of a liquid crystal device according to the eighth embodiment of the invention described above.

Figure 15A:
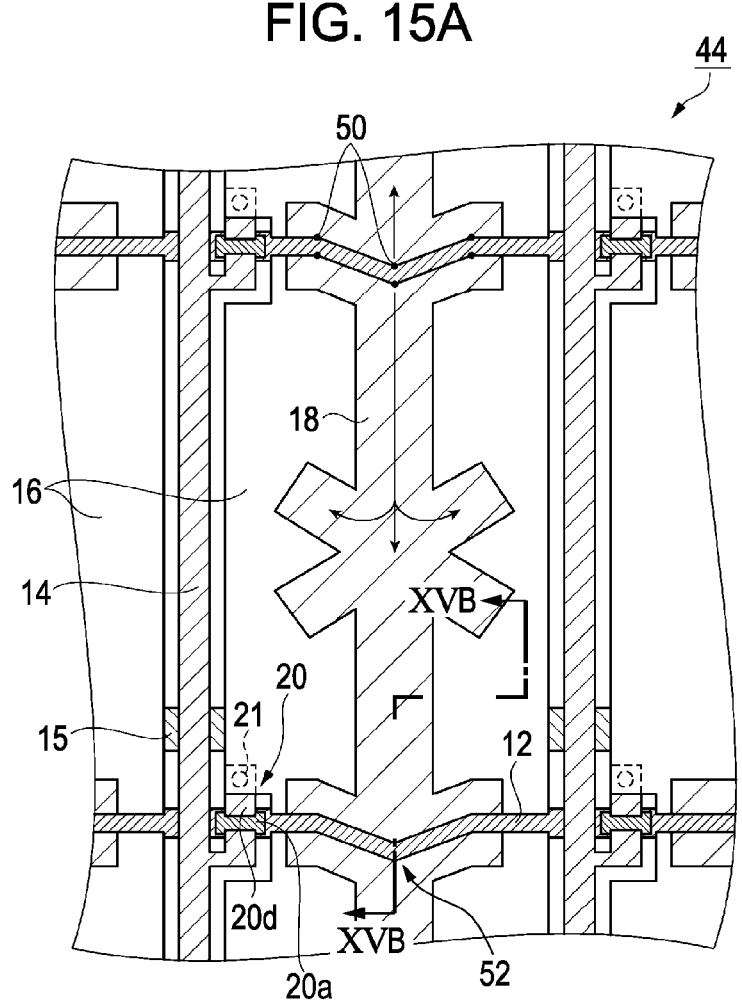
Figure 15B:
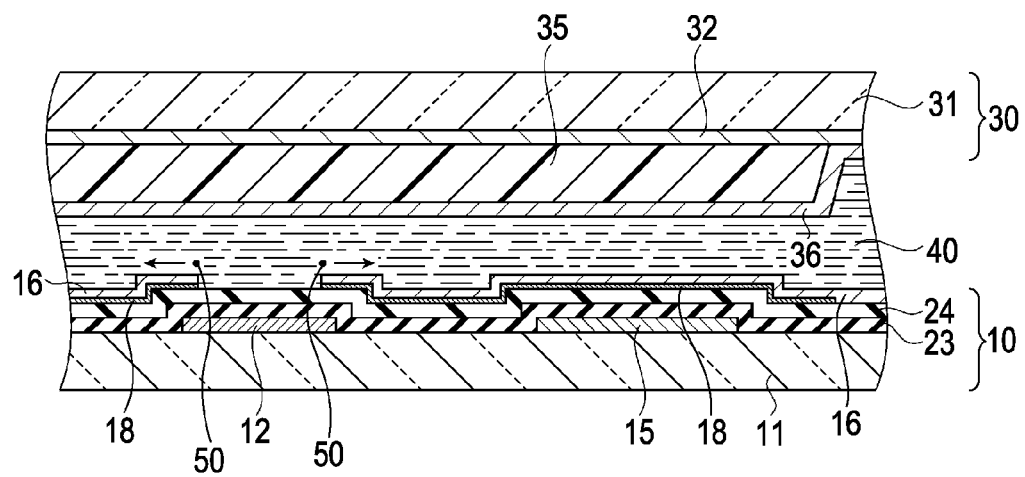
FIG. 15B shows a sectional view taken along the line XVB-XVB of FIG. 15A.

FIG. 15 is a set of diagrams that schematically illustrates an example of the pixel configuration of an OCB-mode liquid crystal device according to the tenth exemplary embodiment of the invention; or, more specifically, FIG. 15A shows a plan view thereof as viewed from the counter-substrate (30) side whereas FIG. 15B shows a sectional view taken along the line XVB-XVB of FIG. 15A. In the configuration of the liquid crystal device 1 according to the tenth exemplary embodiment of the invention, as illustrated in FIG. 15A, the gate line 12 has a V-shaped bent portion 52. As further illustrated therein, among four sides of the pixel electrode 16, each of two sides thereof that extend along the gate lines 12 also has a V-shaped bent portion that is inflected along, or, for example, either perfectly or substantially fits with the above-mentioned V-shaped bent portion 52 of the corresponding gate line 12. As shown in FIG. 15A, the reflective film 18, which is a single non-separated film, extends from the bent portion of one side of the pixel electrode 16 that extends along the gate line 12 to the bent portion of the other opposite side of the pixel electrode 16 that extends along the gate line 12. At the central region of the pixel electrode 16, the reflective film 18 has a radial protruding portion that extends from the above-described bent-to-bent extending portion thereof. The liquid crystal layer thickness adjustment layer 35 (refer to FIG. 15B) is formed over the liquid-crystal-side surface of the base substrate substance 31 of the counter substrate 30 at, at least, a region that overlaps the reflective film 18 in a plan view. More specifically, the reflective film 18 and the liquid crystal layer thickness adjustment layer 35 are formed in such a manner that they mainly extend from the bent portion of the top (bottom) side of the pixel electrode 16 to the bent portion of the bottom (top) side thereof as illustrated in the plan view of FIG. 15A. The bent-to-bent extending portion thereof is parallel to the source lines 14. Furthermore, the above-described radial protruding portion thereof, which is made up of two band-like protruding regions each of which is formed at an oblique angle with respect to the bent-to-bent extending portion thereof, extends from the bent-to-bent extending portion thereof at the central region of the pixel electrode 16. In the illustrated exemplary configuration of the liquid crystal device 1 according to the present embodiment of the invention, the bent-to-bent extending portion of the formation area of the reflective film 18 and the liquid crystal layer thickness adjustment layer 35, which is parallel to the source lines 14, and the above-mentioned two band-like protruding regions, each of which intersects with the bent-to-bent extending portion thereof, form an angle of 60° with respect to one another. Therefore, the formation area of the reflective film 18 and the liquid crystal layer thickness adjustment layer 35 has the shape similar to an asterisk (*) at the center of the pixel electrode 16 or in the vicinity/neighborhood thereof, thereby forming a six-directional radiation pattern centering the intersection of the bent-to-bent extending portion thereof and the above-mentioned two band-like protruding regions thereof. In the illustrated exemplary configuration (refer to FIG. 15B) of the liquid crystal device 1 according to the present embodiment of the invention, the liquid crystal layer thickness adjustment layer 35 is formed at the liquid-crystal-side surface of the base substrate substance 31 of the counter substrate 30 not only at the above-mentioned reflective-film region that overlaps the reflective film 18 in a plan view but also at an inter-reflective-film region that lies, in a plan view, between two reflective films 18 arrayed adjacent to each other with the gate line 12 being interposed between the above-mentioned two reflective films 18 arrayed adjacent to each other.

With the configuration of the liquid crystal device 1 according to the present embodiment of the invention described above, it is possible to offer the same advantage as that of the foregoing fifth, sixth, eighth, or ninth exemplary embodiment of the invention; that is, at the time of orientation-state transition operation, it is possible to complete the spreading of the bend alignment area to the center region of the pixel electrode 16 in a shorter time period. The bend alignment area, which spreads along the formation region of the reflective film 18 from the vicinity/neighborhood of each of the above-mentioned two sides of the pixel electrode 16 toward the central region of the pixel electrode 16, has a spreading velocity component that is parallel to the source lines 14. At the center of the pixel electrode 16 and in the vicinity/neighborhood thereof, the bend alignment area having radial spreading velocity components spreads along the above-mentioned protrusion, which intersects with the above-mentioned bent-to-bent extending portion. In the illustrated exemplary configuration of the liquid crystal device 1 according to the present embodiment of the invention, the bend alignment area spreads with spreading velocity components of 60° with respect to the extending direction of the source line 14. A trifurcated arrow shown in FIG. 15A indicates a non-limiting example of the spreading paths, that is, trajectories of the bend alignment area. Accordingly, even when the bend alignment area spreads over a region at which the reflective film 18 and the liquid crystal layer thickness adjustment layer 35 are not formed, it does so while having the above-described spreading velocity components. Therefore, the configuration of the liquid crystal device 1 according to the tenth exemplary embodiment of the invention described above makes it possible to spread the bend alignment area over the entire region of the pixel electrode 16 in a short period of time.

Moreover, since the gate line 12 and the pixel electrode 16 partially overlap each other in the configuration of the liquid crystal device 1 according to the present embodiment of the invention, at the partial overlap region where the gate line 12 and the pixel electrode 16 partially overlap each other, it is possible to create splay-to-bend transition nuclei with a lower transition voltage in the first step of the orientation-state transition operation thereof; and in addition thereto, it is further possible to spread the bend alignment area in an easier manner in the second step of the orientation-state transition operation thereof.

Electronic Apparatus

Figure 16:
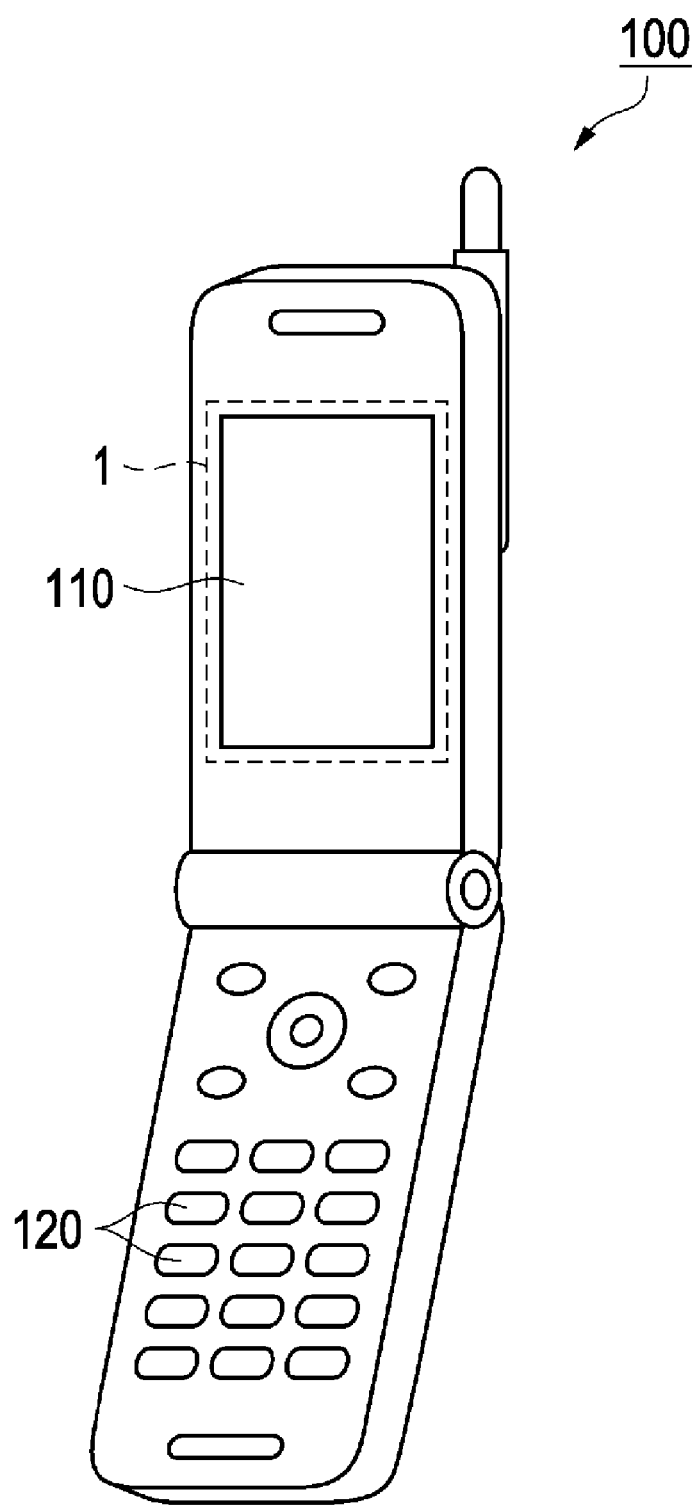
FIG. 16 is a perspective view that schematically illustrates an example of the configuration of a mobile phone that adopts, as its display device, a liquid crystal device according to an exemplary embodiment of the invention; the mobile phone is a non-limiting example of a variety of electronic apparatuses.

The liquid crystal device 1 described above can be used as a component of various kinds of electronic apparatuses. As an example of various applications thereof, the liquid crystal device 1 described above can be used as a display device of a mobile phone, though not limited thereto. FIG. 16 is a perspective view that schematically illustrates an example of the configuration of a mobile phone 100 that adopts, as its display device, a liquid crystal device according to an exemplary embodiment of the invention. The mobile phone 100 is a non-limiting example of a variety of electronic apparatuses. The mobile phone 100 is provided with an image display unit 110 and a plurality of manual operation buttons 120. The image display unit 110 of the mobile phone 100 has the liquid crystal device 1 as its built-in image display device. Through the functioning of the built-in liquid crystal device 1, the image display unit 110 thereof displays a variety of information and content that includes but not limited to user-input information and incoming-call information. A user can input various kinds of information into the mobile phone 100 by manipulating the manual operation buttons 120. An electronic apparatus that is provided with the liquid crystal device 1 according to any of exemplary embodiments of the invention described above is capable of carrying out splay-to-bend orientation-state transition in a short period of time or with reduced power consumption. In addition, it is possible to use/adopt a lower voltage-resistant driving circuit for image-display operation.

The liquid crystal device 1 according to an aspect of the present invention can be implemented as a component of a variety of electronic apparatuses, including but not limited to, a mobile computer, a digital camera, a digital video camera, automobile-installed equipment, and audio equipment, in addition to the mobile phone 100 described above. Or, as another non-limiting application example thereof, the liquid crystal device 1 according to an aspect of the present invention can be used as a light valve that is built in a projection-type display device such as a projector or the like.

Although various exemplary embodiments of the present invention are described above, needless to say, the invention is in no case restricted to these exemplary embodiments described herein; the invention may be configured in an adaptable manner in a variety of variations and/or modifications without departing from the spirit thereof.

VARIATION EXAMPLE 1

Figure 17:
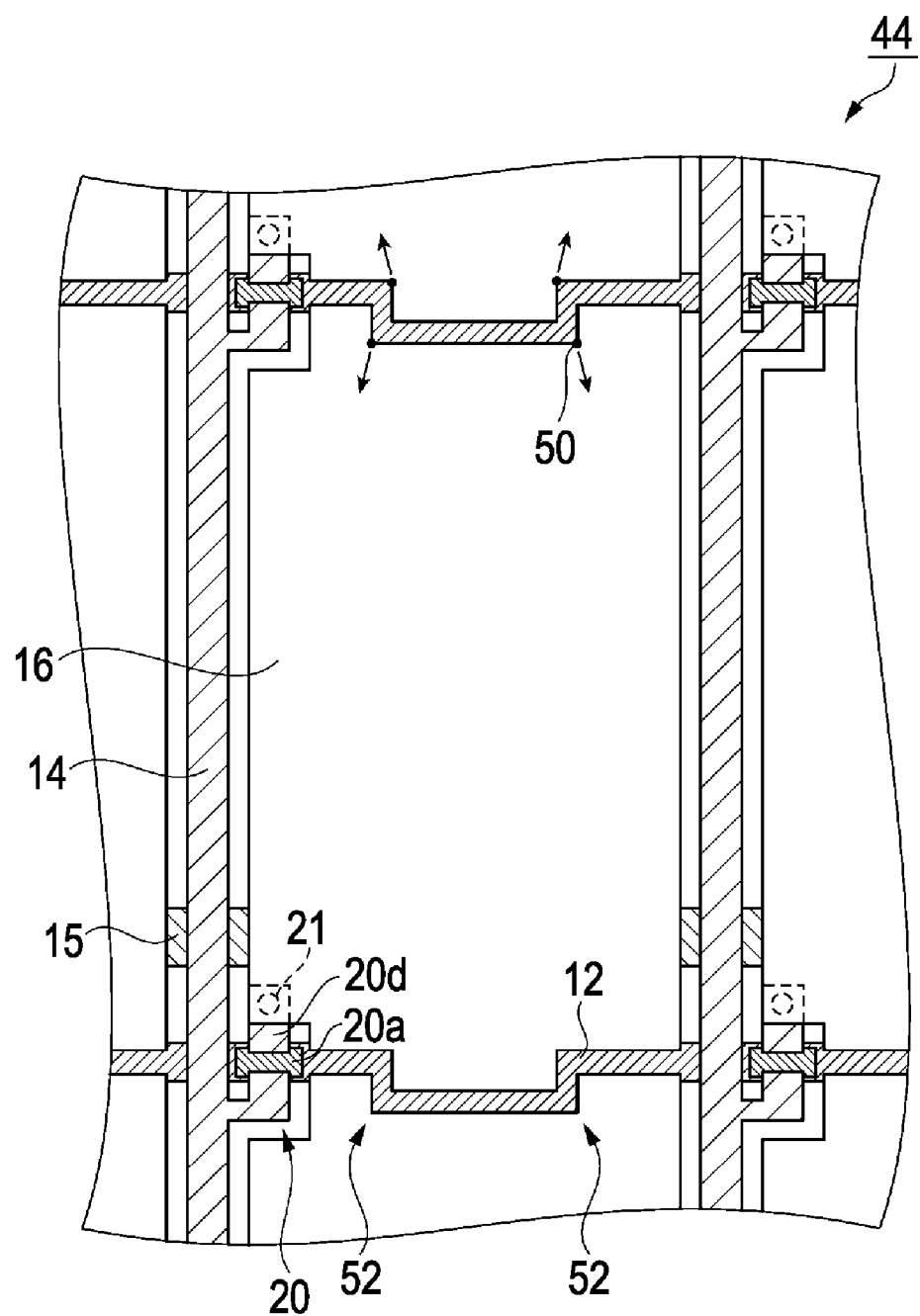
FIG. 17 is a plan view that schematically illustrates an example of the pixel configuration of an OCB-mode liquid crystal device according to a variation example of the invention.

In the foregoing description of the liquid crystal device 1 according to an exemplary embodiment of the invention, it is explained that the bent portion 52 that is formed on the gate line 12 and/or the source line 14 has the shape of an alphabet V. However, the scope of the invention is not limited thereto. As a non-limiting modification example thereof, the bent portion 52 that is formed on the gate line 12 and/or the source line 14 may have a rectangular shape. For example, as illustrated in FIG. 17, the bent portion 52 of the gate line 12 has a rectangular shape. That is, regardless of the shape of the bent portion 52, it is possible to generate splay-to-bend transition nuclei in the vicinity of the bent portion 52 in an easy manner as a result of the application of a transition voltage between the gate line 12 and the pixel electrode 16 and/or between the source line 14 and the pixel electrode 16.

VARIATION EXAMPLE 2

Technical features that are described in the ninth exemplary embodiment of the invention or the tenth exemplary embodiment of the invention may be incorporated into the configuration of the liquid crystal device 1 according to the fifth exemplary embodiment of the invention or the sixth exemplary embodiment of the invention. That is, the reflective film 18 and the liquid crystal layer thickness adjustment layer 35 may be formed in such a region that has the shape of a cross or an asterisk (i.e., radial pattern) at the central region of the pixel electrode 16 even in a non-overlapping configuration in which the gate line 12 or the source line 14 does not overlap the pixel electrode 16 at all in a plan view. If such a modified configuration of the liquid crystal device 1 according to an exemplary embodiment of the invention described above is adopted, at the time of orientation-state transition operation, it is possible to spread the bend alignment area over the entire region of the pixel electrode 16 in a shorter time period.

What is claimed is:

1. An optically compensated birefringence mode liquid crystal device comprising:
   a first substrate;
   a second substrate that is provided opposite to the first substrate;
   a liquid crystal layer that is interposed between the first substrate and the second substrate;
   a plurality of gate lines that is formed at the liquid-crystal-layer side of the first substrate;
   a plurality of source lines that is formed at the liquid-crystal-layer side of the first substrate, the plurality of source lines intersecting with the plurality of gate lines in a plan view;
   a plurality of switching elements that is formed at the liquid-crystal-layer side of the first substrate, the plurality of switching elements being formed at a positions in a one-to-one correspondence with intersections of the gate lines and the source lines; and
   a plurality of pixel electrodes that is formed at the liquid-crystal-layer side of the first substrate, one of the pixel electrodes being electrically connected to a corresponding one of the switching elements,
   wherein the one of the pixel electrodes overlaps in a plan view a part of one of the gate lines that is adjacent to the one of the pixel electrodes and/or a part of one of the source lines that is adjacent to the one of the pixel electrodes.

2. The optically compensated birefringence mode liquid crystal device according to claim 1, wherein the one of the pixel electrodes has, at least, two sides that extend along the one of the gate lines and further has two sides that extend along the one of the source lines; and the one of the gate lines and/or the one of the source lines does not correspond to the one of the switching elements that is electrically connected to the one of the pixel electrodes.

3. The optically compensated birefringence mode liquid crystal device according to claim 1, wherein the one of the gate lines and/or the one of the source lines has at least one bent portion; a corresponding side of the one of the pixel electrodes that extends along the one of the gate lines and/or along the one of the source lines is bent along the bent portion of the one of the gate lines and/or of the one of the source lines; and the one of the pixel electrodes overlaps, at the bent portion, a part of the one of the gate lines and/or a part of the one of the source lines in a plan view.

4. The optically compensated birefringence mode liquid crystal device according to claim 3, wherein the bent portion has a shape of an alphabet V or a shape of a rectangle.

5. The optically compensated birefringence mode liquid crystal device according to claim 3, further comprising:
   a reflective film that is formed at, at least, an area extending in a plan view along, or an area that has a side extending in a plan view along the bent portion at the liquid-crystal-layer side of the first substrate; and
   a liquid crystal layer thickness adjustment layer that is formed at a region that overlaps the reflective film in a plan view at the liquid-crystal-layer side of the second substrate.

6. The optically compensated birefringence mode liquid crystal device according to claim 5, wherein two sides of the one of the pixel electrodes that are opposite to each other are bent along the bent portion of the one of the gate lines and/or of the one of the source lines; and the reflective film and the liquid crystal layer thickness adjustment layer are formed at an area that extends from one of the two sides to the other opposite side thereof in a plan view in a single non-separated manner.

7. The optically compensated birefringence mode liquid crystal device according to claim 6, wherein the reflective film and the liquid crystal layer thickness adjustment layer have an area portion whose width increases as a distance from the bent side of the one of the pixel electrodes increases or an area portion whose width is relatively large as a distance from the bent side of the one of the pixel electrodes is relatively great.

8. The optically compensated birefringence mode liquid crystal device according to claim 6, wherein the reflective film and the liquid crystal layer thickness adjustment layer have an area portion that extends in a radial pattern at a center area of the one of the pixel electrode.

9. An electronic apparatus that is provided with the optically compensated birefringence mode liquid crystal device according to claim 1.

* * * * *